(12) United States Patent
Hoover et al.

(10) Patent No.: US 9,813,440 B1
(45) Date of Patent: Nov. 7, 2017

(54) POLYMORPHIC TREATMENT OF ANNOTATED CONTENT

(71) Applicant: Shape Security, Inc., Palo Alto, CA (US)

(72) Inventors: Roger S. Hoover, Granite Canon, WY (US); Justin D. Call, Santa Clara, CA (US)

(73) Assignee: Shape Security, Inc., Mountain View, CA (US)

( * ) Notice: Subject to any disclaimer, the term of this patent is extended or adjusted under 35 U.S.C. 154(b) by 34 days.

(21) Appl. No.: 14/713,493

(22) Filed: May 15, 2015

(51) Int. Cl.
*G06F 21/00* (2013.01)
*H04L 29/06* (2006.01)
*G06F 17/24* (2006.01)
*G06F 9/44* (2006.01)

(52) U.S. Cl.
CPC ............ *H04L 63/1441* (2013.01); *G06F 8/73* (2013.01); *G06F 17/241* (2013.01)

(58) Field of Classification Search
CPC ................... H04L 63/1466; H04L 63/1475
USPC ............. 726/1, 4, 5, 12, 14, 23, 26, 27, 30; 713/150, 168, 171, 172, 175, 189
See application file for complete search history.

(56) References Cited

U.S. PATENT DOCUMENTS

| | | |
|---|---|---|
| 6,266,684 B1 | 7/2001 | Kraus |
| 7,424,720 B2 | 9/2008 | Chagoly |
| 7,475,341 B2 | 1/2009 | Malik |
| 7,480,385 B2 | 1/2009 | Weber |
| 7,707,223 B2 | 4/2010 | Zubenko et al. |
| 7,836,425 B2 | 11/2010 | Rubin et al. |
| 7,895,653 B2 | 2/2011 | Calo et al. |
| 8,020,193 B2 | 9/2011 | Bhola et al. |
| 8,170,020 B2 | 5/2012 | Oliver et al. |
| 8,200,958 B2 | 6/2012 | Coppola et al. |
| 8,266,202 B1 | 9/2012 | Colton et al. |

(Continued)

FOREIGN PATENT DOCUMENTS

| | | |
|---|---|---|
| GB | 2443093 | 4/2008 |
| WO | WO2000/72119 | 11/2000 |

(Continued)

OTHER PUBLICATIONS

Currie et al., "In-the-wire authentication: Protecting client-side critical data fields in secure network transactions," 2nd International Conference on Adaptive Science and Technology, 2009, pp. 232-237.

(Continued)

*Primary Examiner* — Alexander Lagor

(57) ABSTRACT

A computer-implemented method includes receiving content and annotation information that describe a structure of the content, the annotation information having been previously generated by a sub-system that is separate from a content transformation sub-system and at a time before the content was requested to be served; interpreting the annotation information to generate transcoding rules that identify one or more portions of the received content to be transcoded in serving the content; applying the transcoding rules to the content to change the content in a manner that interferes with an ability of malware on a client device to interfere with operation of the content; and providing the transcoded content to a client device that requested the content.

21 Claims, 9 Drawing Sheets

(56) References Cited

U.S. PATENT DOCUMENTS

| | | |
|---|---|---|
| 8,601,064 B1 | 12/2013 | Liao |
| 8,806,627 B1 | 8/2014 | Aharoni |
| 8,892,687 B1 | 11/2014 | Call |
| 8,954,583 B1 | 2/2015 | Zhou |
| 9,075,990 B1 | 7/2015 | Yang |
| 9,104,878 B1 | 8/2015 | Khairetdinov |
| 9,225,729 B1 | 12/2015 | Moen |
| 9,225,737 B2 | 12/2015 | Call |
| 9,275,222 B2 | 3/2016 | Yang |
| 9,456,050 B1 | 9/2016 | Lepeska |
| 9,563,929 B1 | 2/2017 | Sokolowski |
| 9,609,006 B2 | 3/2017 | Call |
| 2002/0099827 A1 | 7/2002 | Shah et al. |
| 2003/0005129 A1 | 1/2003 | Scheinkman |
| 2004/0162994 A1 | 8/2004 | Cohen et al. |
| 2005/0172338 A1 | 8/2005 | Sandu |
| 2005/0198099 A1 | 9/2005 | Motsinger |
| 2005/0204348 A1 | 9/2005 | Horning |
| 2005/0216770 A1 | 9/2005 | Rowett |
| 2005/0278626 A1 | 12/2005 | Malik |
| 2006/0212932 A1 | 9/2006 | Patrick |
| 2006/0230288 A1 | 10/2006 | Fox |
| 2007/0083933 A1 | 4/2007 | Venkatapathy |
| 2007/0245027 A1 | 10/2007 | Ghosh |
| 2008/0222736 A1 | 9/2008 | Boodaei et al. |
| 2008/0250310 A1 | 10/2008 | Chen |
| 2009/0144829 A1 | 6/2009 | Grigsby et al. |
| 2009/0193513 A1 | 7/2009 | Agarwal et al. |
| 2009/0216882 A1 | 8/2009 | Britton |
| 2009/0249310 A1 | 10/2009 | Meijer et al. |
| 2009/0282062 A1 | 11/2009 | Husic |
| 2009/0292791 A1 | 11/2009 | Livshits |
| 2010/0088404 A1 | 4/2010 | Mani |
| 2010/0100927 A1 | 4/2010 | Bhola et al. |
| 2010/0106611 A1 | 4/2010 | Paulsen |
| 2010/0142382 A1 | 6/2010 | Jungck et al. |
| 2010/0218253 A1 | 8/2010 | Andrew |
| 2010/0235636 A1* | 9/2010 | Cohen ............. G06F 9/44526 713/168 |
| 2010/0257354 A1 | 10/2010 | Johnston et al. |
| 2010/0262780 A1 | 10/2010 | Mahan et al. |
| 2010/0287132 A1 | 11/2010 | Hauser |
| 2011/0015917 A1 | 1/2011 | Wang et al. |
| 2011/0154473 A1 | 6/2011 | Anderson |
| 2011/0173526 A1 | 7/2011 | Schwarzbauer |
| 2011/0178973 A1 | 7/2011 | Lopez et al. |
| 2011/0231305 A1 | 9/2011 | Winters |
| 2011/0255689 A1 | 10/2011 | Bolotov |
| 2011/0296391 A1 | 12/2011 | Gass et al. |
| 2011/0320816 A1 | 12/2011 | Yao |
| 2012/0022942 A1 | 1/2012 | Holloway |
| 2012/0096116 A1 | 4/2012 | Mislove et al. |
| 2012/0124372 A1 | 5/2012 | Dilley et al. |
| 2012/0159193 A1 | 6/2012 | Spradlin et al. |
| 2012/0254727 A1 | 10/2012 | Jain |
| 2013/0031037 A1 | 1/2013 | Brandt |
| 2013/0091582 A1 | 4/2013 | Chen et al. |
| 2013/0198607 A1 | 8/2013 | Mischook et al. |
| 2013/0232234 A1 | 9/2013 | Kapur et al. |
| 2013/0273882 A1 | 10/2013 | Walsh |
| 2014/0040051 A1 | 2/2014 | Ovick |
| 2014/0089786 A1 | 3/2014 | Hashmi |
| 2014/0289830 A1 | 9/2014 | Lemaster |
| 2014/0310392 A1 | 10/2014 | Ho |
| 2014/0379902 A1 | 12/2014 | Wan |
| 2015/0058992 A1 | 2/2015 | El-Moussa |
| 2015/0067031 A1 | 3/2015 | Acharya |
| 2015/0163201 A1 | 6/2015 | Call et al. |
| 2015/0235362 A1 | 8/2015 | Ghosh |
| 2015/0262183 A1 | 9/2015 | Gervais |
| 2015/0341385 A1 | 11/2015 | Sivan |
| 2015/0378876 A1 | 12/2015 | Ji |
| 2016/0005029 A1 | 1/2016 | Ivey |
| 2016/0191351 A1* | 6/2016 | Smith ............... H04L 43/062 709/219 |
| 2016/0344769 A1 | 11/2016 | Li |
| 2016/0359901 A1 | 12/2016 | Yang |
| 2017/0012960 A1 | 1/2017 | Idika |
| 2017/0063923 A1 | 3/2017 | Yang |
| 2017/0118241 A1 | 4/2017 | Call |
| 2017/0201540 A1 | 7/2017 | Call |

FOREIGN PATENT DOCUMENTS

| | | |
|---|---|---|
| WO | WO2002/093369 | 11/2002 |
| WO | WO2010/046314 | 4/2010 |
| WO | WO2013091709 | 6/2013 |
| WO | WO 2017/007936 | 1/2017 |
| WO | 2017/040453 | 3/2017 |
| WO | WO 2017/074622 | 5/2017 |

OTHER PUBLICATIONS

Li et al., WebShield: Enabling Various Web Defense Techniques Without Client Side Modifications, Aug. 15, 2009, 18 pages.

CTNF, dated Feb. 17, 2017, re: Siying Yang, U.S. Appl. No. 15/235,909, filed Aug. 12, 2016.

NOA, dated Feb. 16, 2017, re: Justin D. Call, U.S. Appl. No. 14/822,287, filed Aug. 10, 2015.

NOA, dated Mar. 2, 2017, re: Justin D. Call, U.S. Appl. No. 14/930,198, filed Nov. 2, 2015.

CTNF, dated Nov. 30, 2016, re: Siying Yang, U.S. Appl. No. 14/841,013, filed Aug. 31, 2015.

NOA, dated Mar. 10, 2017, re: Roger S. Hoover, U.S. Appl. No. 14/470,082, filed Aug. 27, 2014.

CTNF, dated Mar. 10, 2017, re: Justin D. Call, U.S. Appl. No. 14/922,436, filed Oct. 26, 2015.

CTNF, dated Mar. 9, 2017, re: Siying Yang, U.S. Appl. No. 14/925,547, filed Oct. 28, 2015.

NOA, dated Mar. 16, 2017, re: Siying Yang, U.S. Appl. No. 15/052,951, filed Feb. 25, 2016.

CTNF, dated Feb. 26, 2015, re: Justin Call, U.S. Appl. No. 14/055,576, filed Oct. 16, 2013.

NOA, dated Aug. 21, 2015, re: Justin Call, U.S. Appl. No. 14/055,576, filed Oct. 16, 2013.

NOA, dated Jun. 19, 2015, re: Justin Call, U.S. Appl. No. 14/055,583, filed Oct. 16, 2013.

CTNF, dated Dec. 24, 2013, re: Justin Call, U.S. Appl. No. 14/055,646, filed Oct. 16, 2013.

CTFR, dated May 27, 2014, re: Justin Call, U.S. Appl. No. 14/055,646, filed Oct. 16, 2013.

NOA, dated Aug. 12, 2014, re: Justin Call, U.S. Appl. No. 14/055,646, filed Oct. 16, 2013.

NOA, dated Sep. 4, 2014, re: Justin Call, U.S. Appl. No. 14/055,646, filed Oct. 16, 2013.

CTFR, dated Apr. 9, 2015, re: Justin Call, U.S. Appl. No. 14/055,704, filed Oct. 16, 2013.

CTNF, dated Dec. 4, 2014, re: Justin Call, U.S. Appl. No. 14/055,704, filed Oct. 16, 2013.

CTNF, dated Dec. 30, 2013, re: Justin Call, U.S. Appl. No. 14/055,704, filed Oct. 16, 2013.

CTFR, dated Apr. 22, 2014, re: Justin Call, U.S. Appl. No. 14/055,704, filed Oct. 16, 2013.

CTFR, dated Sep. 25, 2015, re: Marc Hansen, U.S. Appl. No. 14/055,714, filed Oct. 16, 2013.

CTNF, dated Mar. 16, 2015, re: Marc Hansen, U.S. Appl. No. 14/055,714, filed Oct. 16, 2013.

NOA, dated Jan. 13, 2016, re: Marc Hansen, U.S. Appl. No. 14/055,714, filed Oct. 16, 2013.

NOA, dated Jan. 25, 2016, re: Justin Call, U.S. Appl. No. 14/099,437, filed Dec. 6, 2013.

NOA, dated Aug. 3, 2015, re: Justin Call, U.S. Appl. No. 14/099,437, filed Dec. 6, 2013.

CTNF, dated Jun. 10, 2014, re: Xiaoming Zhou, U.S. Appl. No. 14/159,374, filed Jan. 20, 2014.

NOA, dated Sep. 25, 2014, re: Xiaoming Zhou, U.S. Appl. No. 14/159,374, filed Jan. 20, 2014.

(56) References Cited

OTHER PUBLICATIONS

NOA, dated Nov. 10, 2014, re: Xiaoming Zhou, U.S. Appl. No. 14/159,374, filed Jan. 20, 2014.
CTNF, dated Apr. 10, 2014, re: Oscar Steele, U.S. Appl. No. 14/160,105, filed Jan. 21, 2014.
NOA, dated Oct. 17, 2014, re: Oscar Steele, U.S. Appl. No. 14/160,105, filed Jan. 21, 2014.
NOA, dated Aug. 19, 2015, re: Daniel Moen, U.S. Appl. No. 14/160,107, filed Jan. 21, 2014.
CTFR, dated Nov. 6, 2014, re: Justin Call, U.S. Appl. No. 14/160,126, filed Jan. 21, 2014.
CTNF, dated May 23, 2014, re: Justin Call, U.S. Appl. No. 14/160,126, filed Jan. 21, 2014.
NOA, dated Feb. 20, 2015, re: Justin Call, U.S. Appl. No. 14/160,126, filed Jan. 21, 2014.
NOA, dated May 27, 2014, re: Justin Call, U.S. Appl. No. 14/175,923, filed Feb. 7, 2014.
NOA, dated Sep. 11, 2014, re: Justin Call, U.S. Appl. No. 14/175,923, filed Feb. 7, 2014.
NOA, dated Oct. 15, 2014, re: Justin Call, U.S. Appl. No. 14/175,923, filed Feb. 7, 2014.
CTNF, dated Jan. 20, 2016, re: Shishir K. Ramam, U.S. Appl. No. 14/259,869, filed Apr. 23, 2014.
NOA, dated Jun. 21, 2016, re: Shishir K. Ramam, U.S. Appl. No. 14/259,869, filed Apr. 23, 2014.
CTFR, dated Apr. 20, 2016, re: Xinran Wang, U.S. Appl. No. 14/286,324, filed May 23, 2014.
CTNF, dated Aug. 31, 2015, re: Xinran Wang, U.S. Appl. No. 14/286,324, filed May 23, 2014.
CTFR, dated Dec. 2, 2015, re: Xinran Wang, U.S. Appl. No. 14/286,733, filed May 23, 2014.
CTNF, dated May 27, 2015, re: Xinran Wang, U.S. Appl. No. 14/286,733, filed May 23, 2014.
CTFR, dated Jan. 23, 2015, re: Xinran Wang, U.S. Appl. No. 14/286,733, filed May 23, 2014.
CTNF, dated Jul. 14, 2014, re: Xinran Wang, U.S. Appl. No. 14/286,733, filed May 23, 2014.
NOA, dated May 4, 2016, re: Xinran Wang, U.S. Appl. No. 14/286,733, filed May 23, 2014.
CTNF, dated Sep. 1, 2015, re: Ariya Hidayat, U.S. Appl. No. 14/293,895, filed Jun. 2, 2014.
NOA, dated Mar. 30, 2016, re: Ariya Hidayat, U.S. Appl. No. 14/293,895, filed Jun. 2, 2014.
CTNF, dated Feb. 22, 2017, re: Subramanian Varadarajan, U.S. Appl. No. 14/320,403, filed Jun. 30, 2014.
CTNF, dated Oct. 9, 2014, re: Siying Yang, U.S. Appl. No. 14/321,172, filed Jul. 1, 2014.
NOA, dated Mar. 3, 2015, re: Siying Yang, U.S. Appl. No. 14/321,172, filed Jul. 1, 2014.
NOA, dated Oct. 12, 2016, re: Siying Yang, U.S. Appl. No. 14/329,718, filed Jul. 11, 2014.
NOA, dated Aug. 15, 2016, re: Siying Yang, U.S. Appl. No. 14/329,718, filed Jul. 11, 2014.
CTFR, dated May 6, 2016, re: Siying Yang, U.S. Appl. No. 14/329,718, filed Jul. 11, 2014.
CTNF, dated Feb. 3, 2016, re: Siying Yang, U.S. Appl. No. 14/329,718, filed Jul. 11, 2014.
CTFR, dated Feb. 20, 2015, re: Siying Yang, U.S. Appl. No. 14/329,718, filed Jul. 11, 2014.
CTNF, dated Oct. 30, 2014, re: Siying Yang, U.S. Appl. No. 14/329,718, filed Jul. 11, 2014.
NOA, dated Sep. 15, 2015, re: Siying Yang, U.S. Appl. No. 14/329,718, filed Jul. 11, 2014.
NOA, dated Nov. 3, 2016, re: Siying Yang, U.S. Appl. No. 14/329,718, filed Jul. 11, 2014.
NOA, dated Jan. 18, 2017, re: Siying Yang, U.S. Appl. No. 14/329,718, filed Jul. 11, 2014.
CTNF, dated Sep. 30, 2014, re: Siying Yang, U.S. Appl. No. 14/338,207, filed Jul. 22, 2014.
NOA, dated Nov. 7, 2014, re: Siying Yang, U.S. Appl. No. 14/338,207, filed Jul. 22, 2014.
NOA, dated Jan. 6, 2015, re: Siying Yang, U.S. Appl. No. 14/338,207, filed Jul. 22, 2014.
CTNF, dated Jun. 24, 2016, re: Roger Hoover, U.S. Appl. No. 14/470,082, filed Aug. 27, 2014.
CTNF, dated Aug. 28, 2015, re: Roger Hoover, U.S. Appl. No. 14/470,082, filed Aug. 27, 2014.
CTNF, dated Dec. 1, 2016, re: Oscar Steele, U.S. Appl. No. 14/481,663, filed Sep. 9, 2014.
NOA, dated Apr. 27, 2016, re: Siying Yang, U.S. Appl. No. 14/481,835, filed Sep. 9, 2014.
CTNF, dated Oct. 28, 2015, re: Siying Yang, U.S. Appl. No. 14/481,835, filed Sep. 9, 2014.
NOA, dated May 24, 2016, re: Siying Yang, U.S. Appl. No. 14/481,835, filed Sep. 9, 2014.
NOA, dated Jul. 25, 2016, re: Siying Yang, U.S. Appl. No. 14/481,835, filed Sep. 9, 2014.
CTNF, dated Apr. 8, 2016, re: Ariya Hidayat, U.S. Appl. No. 14/481,867, filed Sep. 9, 2014.
CTFR, dated Sep. 6, 2016, re: Ariya Hidayat, U.S. Appl. No. 14/481,867, filed Sep. 9, 2014.
NOA, dated Dec. 16, 2016, re: Ariya Hidayat, U.S. Appl. No. 14/481,867, filed Sep. 9, 2014.
CTNF, dated Jan. 2, 2015, re: Timothy Peacock, U.S. Appl. No. 14/503,346, filed Sep. 30, 2014.
NOA, dated Apr. 10, 2015, re: Timothy Peacock, U.S. Appl. No. 14/503,346, filed Sep. 30, 2014.
CTNF, dated Dec. 14, 2015, re: Oscar Steele, U.S. Appl. No. 14/542,994, filed Nov. 17, 2014.
NOA, dated Mar. 28, 2016, re: Oscar Steele, U.S. Appl. No. 14/542,994, filed Nov. 17, 2014.
CTFR, dated Dec. 28, 2016, re: Siying Yang, U.S. Appl. No. 14/570,466, filed Dec. 15, 2014.
CTNF, dated Apr. 21, 2016, re: Siying Yang, U.S. Appl. No. 14/570,466, filed Dec. 15, 2014.
NOA, dated Dec. 7, 2016, re: Carl Schroeder, U.S. Appl. No. 14/596,944, filed Jan. 14, 2015.
CTNF, dated May 12, 2016, re: Carl Schroeder, U.S. Appl. No. 14/596,944, filed Jan. 14, 2015.
CTNF, dated Apr. 22, 2016, re: Justin Call, U.S. Appl. No. 14/602,038, filed Jan. 21, 2015.
NOA, dated Sep. 19, 2016, re: Justin Call, U.S. Appl. No. 14/602,038, filed Jan. 21, 2015.
NOA, dated Mar. 16, 2016, re: Xiaoming Zhou, U.S. Appl. No. 14/618,389, filed Feb. 10, 2015.
NOA, dated Apr. 12, 2016, re: Xiaoming Zhou, U.S. Appl. No. 14/618,389, filed Feb. 10, 2015.
CTFR, dated Jan. 15, 2016, re: Xiaoming Zhou, U.S. Appl. No. 14/618,389, filed Feb. 10, 2015.
CTNF, dated Oct. 5, 2015, re: Xiaoming Zhou, U.S. Appl. No. 14/618,389, filed Feb. 10, 2015.
CTFR, dated Mar. 30, 2016, re: Siying Yang, U.S. Appl. No. 14/679,596, filed Apr. 6, 2015.
CTNF, dated Nov. 4, 2015, re: Siying Yang, U.S. Appl. No. 14/679,596, filed Apr. 6, 2015.
NOA, dated Jul. 18, 2016, re: Siying Yang, U.S. Appl. No. 14/679,596, filed Apr. 6, 2015.
CTFR, dated May 19, 2016, re: Justin Call, U.S. Appl. No. 14802,140, filed May 1, 2015.
CTNF, dated Oct. 23, 2015, re: Justin Call, U.S. Appl. No. 14802,140, filed May 1, 2015.
CTFR, dated Jul. 15, 2016, re: Justin Call, U.S. Appl. No. 14802,349, filed May 1, 2015.
CTNF, dated Feb. 1, 2016, re: Justin Call, U.S. Appl. No. 14802,349, filed May 1, 2015.
NOA, dated Oct. 24, 2016, re: Justin Call, U.S. Appl. No. 14/702,349, filed May 1, 2015.
CTNF, dated Oct. 7, 2016, re: Roger Hoover, U.S. Appl. No. 14/713,493, filed May 15, 2015.
CTNF, dated Nov. 10, 2016, re: Nwokedi Idika, U.S. Appl. No. 14828,621, filed Jun. 2, 2015.

(56) References Cited

OTHER PUBLICATIONS

NOA, dated Oct. 23, 2015, re: Siying Yang, U.S. Appl. No. 14/790,738, filed Jul. 2, 2015.
CTNF, dated Jul. 18, 2016, re: Justin Call, U.S. Appl. No. 14/822,287, filed Aug. 10, 2015.
CTNF, dated Oct. 19, 2016, re: Justin Call, U.S. Appl. No. 14/929,019, filed Oct. 30, 2015.
NOA, dated Nov. 9, 2016, re: Justin Call, U.S. Appl. No. 14/930,198, filed Nov. 2, 2015.
CTNF, dated Jul. 21, 2016, re: Justin Call, U.S. Appl. No. 14/930,198, filed Nov. 2, 2015.
CTFR, dated Sep. 9, 2016, re: Siying Yang, U.S. Appl. No. 14/968,460, filed Dec. 14, 2015.
CTNF, dated Apr. 8, 2016, re: Siying Yang, U.S. Appl. No. 14/968,460, filed Dec. 14, 2015.
NOA, dated Nov. 16, 2016, re: Justin Call, U.S. Appl. No. 14/980,409, filed Dec. 28, 2015.
CTNF, dated Aug. 2, 2016, re: Justin Call, U.S. Appl. No. 14/980,409, filed Dec. 28, 2015.
CTNF, dated Oct. 7, 2016, re: Siying Yang, U.S. Appl. No. 15/052,951, filed Feb. 25, 2016.
NOA, dated Mar. 29, 2017, re: Siying Yang, U.S. Appl. No. 15/052,951, filed Feb. 25, 2016.
NOA, dated Apr. 11, 2017, re: Siying Yang, U.S. Appl. No. 15/052,951, filed Feb. 25, 2016.
CTNF, dated Dec. 12, 2016, re: Marc Hansen, U.S. Appl. No. 15/148,139, filed May 6, 2016.
CTNF, dated Feb. 6, 2017, re: Xiaoming Zhou, U.S. Appl. No. 15/157,704, filed May 18, 2016.
CTNF, dated Oct. 6, 2016, re: Xiaoming Zhou, U.S. Appl. No. 15/157,704, filed May 18, 2016.
NOA, dated Mar. 7, 2017, re: Xiaoming Zhou, U.S. Appl. No. 15/157,704, filed May 18, 2016.
CTNF, dated May 22, 2017, re: Siying Yang, U.S. Appl. No. 14/329,718, filed Jul. 11, 2014.
NOA, dated May 22, 2017, re: Roger S. Hoover, U.S. Appl. No. 14/713,493, filed May 15, 2015.
NOA, dated Jun. 7, 2017, re: Call, et al., U.S. Appl. No. 14/930,198, filed Jun. 7, 2017.
Detecting and Preventing Drive-By Download Attack via Participative Monitoring of the Web, Jul. 23, 2013.
On-the-fly web content integrity check boosts users' confidence, Nov. 1, 2002.
International Preliminary Report on Patentability, dated Jun. 16, 2016, PCT/US14/68133.
International Search Report, dated Apr. 7, 2015, PCT/US14/68133.
International Search Report, dated Jul. 28, 2015, PCT/US15/31361.
International Search Report, dated Apr. 9, 2015, PCT/US15/12072.
International Preliminary Report on Patentability, dated Nov. 30, 2015, PCT/US15/12072.
International Search Report, dated Jan. 21, 2015, PCT/US14/23635.
International Search Report, dated Feb. 16, 2017, PCT/US16/53472.
International Search Report, dated Dec. 30, 2016, PCT/US16/53392.
International Search Report, dated Nov. 21, 2016, PCT/US16/49357.
International Search Report, dated Oct. 11, 2016, PCT/US16/41337.
International Search Report, dated Aug. 14, 2014, PCT/US14/27805.
International Search Report, dated Aug. 1, 2014, PCT/US14/24232.
International Search Report, dated Jul. 18, 2014, PCT/US14/23897.
CTNF, dated Jun. 2, 2017, re: Arlya Hidayat, U.S. Appl. No. 15/224,978, filed Aug. 1, 2016.
NOA, dated Jun. 30, 2017, re: Roger S. Hoover, U.S. Appl. No. 14/713,493, filed May 15, 2015.
NOA, dated Jun. 9, 2017, re: Carl Schroeder, U.S. Appl. No. 14/596,944, filed Jan. 14, 2015.
CTNF, dated May 25, 2017, re: Daniel G. Moen, U.S. Appl. No. 14/980,231, filed Dec. 28, 2015.
CTFR, dated Jun. 6, 2017, re: Siying Yang, U.S. Appl. No. 15/235,909, filed Aug. 12, 2016.
NOA, dated Jun. 20, 2017, re: Roger S. Hoover, U.S. Appl. No. 14/470,082, filed Aug. 27, 2014.
NOA, dated Jul. 13, 2017, re: Xinran Wang, U.S. Appl. No. 14/286,324, filed May 23, 2014.
NOA, dated Jun. 27, 2017, re: Siying Yang, U.S. Appl. No. 14/841,013, filed Aug. 31, 2015.
NOA, dated Jun. 20, 2017, re: Siying Yang, U.S. Appl. No. 15/052,951, filed Feb. 25, 2016.
EP App. No. 14703229.3, Intention to Grant, EP, Call et al., dated May 23, 2017.
Examination Report No. 1 for Standart Patent Application, App. No. 2014237025, AU, Call, Justin D, dated Sep. 25, 2014.
CTNF, dated Jul. 28, 2017, re: Xinran Wang, U.S. Appl. No. 15/230,540, filed Aug. 8, 2016.
NOA, dated Aug. 4, 2017, re: Justin Call, U.S. Appl. No. 14/929,019, filed Oct. 30, 2015.
CTFR, dated Aug. 14, 2017, re: Marc R. Hansen, U.S. Appl. No. 15/148,139, filed May 6, 2016.
CTNF, dated Aug. 11, 2017, re: Oscar H. Steele III, U.S. Appl. No. 15/224,985, filed Aug. 1, 2016.
NOA, dated Aug. 29, 2017, re: Siying Yang, U.S. Appl. No. 15/052,951, filed Feb. 25, 2016.
NOA, dated Aug. 29, 2017, re: Roger S. Hoover, U.S. Appl. No. 14/713,493, filed May 15, 2015.
CTNF, dated Aug. 30, 2017, re: Justin D. Call, U.S. Appl. No. 15/470,715, filed Mar. 27, 2017.
CTNF, dated Aug. 4, 2017, re: Siying Yang, U.S. Appl. No. 15/242,062, filed Aug. 19, 2016.
CTFR, dated Sep. 5, 2017, re: Siying Yang, U.S. Appl. No. 14/925,547, filed Oct. 28, 2015.

* cited by examiner

POLYMORPHIC TREATMENT OF ANNOTATED CONTENT

TECHNICAL FIELD

This document relates to systems and techniques for interfering with the operation of computer malware, as a mechanism for improving computer system security.

BACKGROUND

Much of our commerce now occurs in the form of e-commerce, through computer users who access services over the Internet and using the World Wide Web. Because this commerce involves money, it draws unsavory characters to its periphery—in the form of fraudsters. The aim of these people is to intercept or otherwise interfere with the activities of legitimate commerce so as to identify confidential information like account numbers, passwords, user IDs, and the like, as a mechanism toward stealing money from such users or from the organizations that provide services to such users. For example, through a technique known as a "Man in the Browser" attack, malware may be loaded on a client computer and may attempt to intercept information such as account numbers and passwords where a user interacts with a banking site, or passwords and credit card information when the user interacts with an on-line retail store.

Various approaches have been taken to identify and prevent such malicious activity. For example, some approaches install defensive software on client computers. Alternative approaches run various kinds of analysis tools on the transactions and/or network traffic on a server system to detect improper activity.

SUMMARY

This document describes systems and techniques by which web code (e.g., HTML, CSS, and JavaScript) is modified before it is served over the Internet by a server system, so as to make more difficult the exploitation of the code and the server system by clients (e.g., various computers such as desktops, laptops, tablets, and smartphones) that receive the code—including clients that are infected by malware without their users' knowledge. In certain implementations discussed below, code served by a web server system can be analyzed and a map, or template, may be generated to permit polymorphic alteration of the code, meaning that the same code is altered in different ways for different times that it is served (either to different people or at different times to a single person). The analysis of the code may be made easier by the provision of annotations that accompany the code and direct how the polymorphic transformations are to be implemented in the code. For example, a header to an HTML or other file may include instructions generated automatically by a programming environment in which the code was created, or manually by a developer of the code, telling a security server system where there are elements in the code that can be changed polymorphically without affecting the functionality of the code. Such annotations may be explicit textual representations, explicit data structure representations, and/or they can be implicitly represented by other structures. For example, when using an application development environment, some annotations could be explicitly attached to ADE data structures while other annotations are implicitly represented by ADE data structures that always imply those implicit annotations.

The annotations may absolve the transformation server system from having to separately analyze the content before transforming it. In addition, the annotations may perform a more complete or at least more compliant transformation of the content, particularly where the annotations are generated by a person or system that initially generated the content. That is because the annotator may be able to change the way the code is created or represented so as to make the code more transformable (e.g., to avoid coding techniques or particular syntaxes that create problems for transformation). Also, the annotator may have more time to perform needed analysis, such as by performing analysis and building a template for transformation as the code is generated. For example, when a programmer defines a new variable in her code, a programming environment may note that action and may keep track of each instance in which the variable name is referenced in the code (as the programmer adds such references). A corresponding transformation map or template may be updated in the background as the programmer adds the references. The template may then be provided in the final code before it is shipped by the developer's system (e.g., in a section to be treated as comments), or other annotations generated from the template may be provided.

Also, where an automatic system is performing analysis at coding-time, it can also provide feedback to the programmer through the programming environment, such as by suggesting that a certain piece of recently-produced code may create a problem for a transformation system, and perhaps suggest an alternative approach for the programmer.

Such feedback may also be provided in coordination with feedback that permits a minifier to operate efficiently on the generated code—where the minifier removes content that will not affect the presentation of the code, so as to make the code smaller for serving, and the transformer changes the content when it is served so as to obfuscate the operation of the code from client-side code or individuals that may try to reverse engineer, otherwise analyze the code, or illicitly interfere with operation of the code.

Programmers may be allowed to opt into such automatic annotation and suggestions on a block-by-block basis. For example, a programmer may author certain software without a concern for security or minification, and may have such an annotation assistance and analysis system turned off when writing such code—e.g., code that controls non-sensitive or non-confidential interaction with a user. The programmer may then turn on the system while writing code for areas for which security is most needed (e.g., financial transaction modules or login modules) by way of directives inline to the source code or alternate software methods.

In one implementations, a computer-implemented method comprises receiving, at a content transformation sub-system, content to be served to a computer user over the Internet, and annotation information that describe a structure of the content, the annotation information having been previously generated by a sub-system that is separate from the content transformation sub-system and at a time before the content was requested to be served; interpreting the annotation information to generate transcoding rules that identify one or more portions of the received content to be transcoded in serving the content; applying the transcoding rules to the content to change the content in a manner that interferes with an ability of malware on a client device to interfere with operation of the content; and providing the transcoded content to a client device that requested the content.

In some aspects, the method also comprises interpreting the annotation information to generate transformations that are to be performed on each of the one or more portions of the received content. The annotation information can define a plurality of types of transformations that are to be applied to the received content, and one or more locations in the content at which each of the types of transformations is to be applied. Also the annotation information can be received in a common electronic file along with the portions of the received content to which the transformation rules are applied. The provided transcoded content, in such a situation, may not include the annotation information, and the version of the content received by the content transformation sub-system does include the annotation information. Moreover, the received content can include a first file having a pointer to a location at which the annotation information can be accessed by the content transformation sub-system In yet other aspects, the transcoded web content can be served to the requesting client device with additional, executable code that is to be run on the requesting client device and that is arranged to identify attempted interaction on the requesting client device with the transcoded content and to report some or all of the identified attempted interaction to a central server system. Also, the additional, executable code can be generated by an intermediary security server system located between a web server system and the Internet, and that intercepts data served from, and requests provided to, the web server system. In addition, the annotation information can have been entered by a programmer of the content while programming the content, in response to suggestions for annotations automatically provided by a software development environment. The method can also comprise applying minification rules to the content to reduce a size of the content before providing the transcoded content to the client device that requested the content.

In another implementation, a computer-implemented system is disclosed that comprises one or more devices including computer-readable media storing electronic program code and associated annotations that identify locations in the program code at which transcoding is to occur when the program code is served; a content transformation sub-system executed by one or more computer servers and arranged to obtain the program code and associated annotations, and to interpret the associated annotations so as to generate transcoding rules that identify one or more portions of the program code to be transcoded in serving the program code; and a web interface arranged to provide the transcoded program code to client devices that request content. The system can also include a software development environment executed with one or more computer systems to generate a programming environment that accepts annotations to program code made by a programmer of the program code, the annotations identifying changes to be made to the program code after the program code is requested but before the program code is served, and saves the code and annotations to the one or more devices.

In some aspects, the content transformation sub-system is further programmed to generate transformations that are to be performed on each of the one or more portions of the program code. Also, the annotation information can define a plurality of types of security countermeasures to be applied to the program code, and one or more locations in the program code at which each of the types of security countermeasures is to be applied. In addition, the received program code can include a first file having a pointer to a location at which the annotations can be accessed by the content transformation sub-system In yet other aspects, the transcoded program code is served to the requesting client devices with additional, executable code that is to be run on the requesting client devices and that is arranged to identify attempted interaction on the requesting client devices with the transcoded program code and to report to a central server system some or all of the identified attempted interaction. Also, the annotations can be automatically generated by an analysis sub-system that attends to the software development environment. Moreover, the software development environment can be programmed to apply minification rules to the program code to reduce a size of the program code before providing the transcoded program code to the client device that requested the program code.

In yet another implementation, a computer-implemented system is disclosed that comprises a software development environment executed with one or more computer systems to generate a programming environment that accepts annotations to program code made by a programmer of the program code, the annotations identifying changes to be made to the program code after the program code is requested but before the program code is served; means for transcoding the program code using the annotations; and a web interface arranged to provide the transcoded program code to client devices that request content. The received program code can include a first file having a pointer to a location at which the annotations can be accessed by the content transformation sub-system. Also the transcoded program code can be served to the requesting client devices with additional, executable code that is to be run on the requesting client devices and that is arranged to identify attempted interaction on the requesting client devices with the transcoded program code and to report to a central server system some or all of the identified attempted interaction. Likewise, the annotations can be automatically generated by an analysis sub-system that attends to the software development environment, and the software development environment can be programmed to apply minification rules to the program code to reduce a size of the program code before providing the transcoded program code to the client device that requested the program code.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Described below are systems and techniques for deflecting and detecting malware activity on client devices to which a server system serves computer code. The examples discussed below may also be used in other settings to insert security countermeasures into a content serving system. The particular examples discussed here involve, among other things, performing analysis on content before the content is called to be served. Such analysis can allow the content to be compressed through minification, and also permit the insertion of security countermeasures into the content.

The analysis may occur at different times before the serving of the content, including when the content is initially developed, when the content (e.g., as programming code) is compiled or published, and after the content is compiled or published. For example, development-time analysis may occur as a programmer is adding code to a code base, with an analysis sub-system forming an updated map that can be used for traversing the content as part of minification and security efforts later, and also identifying coding actions by the programmer that create problems for minification or security, but that could be changed by the programmer in real-time and thus eliminate some of those problems. The analysis may also be performed by a dedicated analysis system that then transfers to a security service and system the content and associated annotations (which may include instructions that provide a map to parts of the content that need to be transcoded when the content is ultimately served).

Figure 1A:
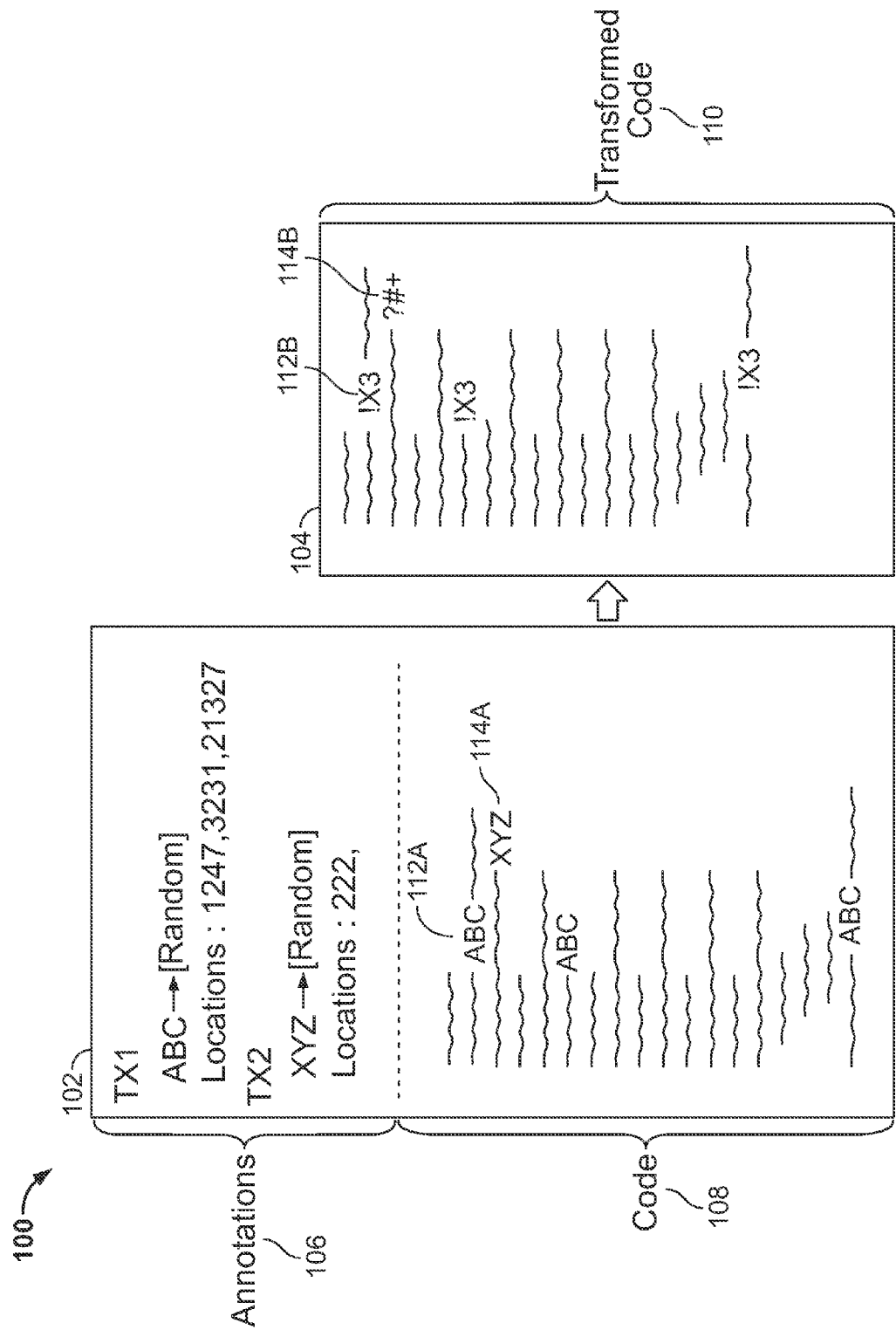
FIG. 1A shows graphically the use of annotations to guide content transcoding.

The annotations generated by the analysis may be attached to the underlying content in a variety of ways so that a transcoding, or transformation, system that subsequently receives the content can use the annotations to transcode the content and/or to implement other countermeasures that are specific to the content. For example, the annotations may be inserted by the analysis system into a file that contains the content or part of the content (e.g., an HTML file). Alternatively, the file that contains the content can include a flag or pointer to a file that contains the corresponding annotations. As yet another alternative, the annotations may be stored in a known location in a predetermined manner so that the transformation system can readily find the annotations that correspond to a particular piece or pieces of content, for example, looking for an annotation file in an annotations directory that matches the name of a code file in a code directory FIG. 1A shows graphically the use of annotations to guide content transcoding. In general, the figure shows a highly simplified representation of an electronic document 102 that may be produced by a Web server system for serving to one or more clients that request the electronic document 102. The electronic document 102 may include, for example, HTML for producing a web page when the content of the electronic document 102 is rendered by a web browser at a client device. The electronic document 102 may be a single electronic document or may be split into multiple documents, such as HTML code in one document, one or more cascading style sheet (CSS) documents that are associated with the HTML document or documents, and one or more JavaScript files that are also associated with the HTML document or documents. (e.g., are pointed to in a line of the HTML document) Additional types of content may also be served, though the techniques described here are focused on modifications that may be made to executable web code, so as to prevent easy operation for malicious malware that might be installed on clients that receive and execute the web code.

Looking more specifically now at electronic document 102, the document 102 includes annotations 106 and code 108. The code 108 may take a variety of forms, such as HTML or JavaScript code. For example, the code 108 may include commands that cause a login screen to be rendered on a browser of a device, such as for content served by an Internet retailer or banker. Such an organization may wish to provide security for a login screen, so that malicious parties may not readily obtain user passwords and other credentials, such as by the use of a "man in the browser" mode of attack on a client device.

The annotations may have been added to the top of the file that holds the source code 108 by a Web server system at the time of serving, or may have been provided with the code by another system, such as an application development environment (ADE) used by a programmer of the web code. The annotations 106 provide commands for a security system to perform actions on the code 108 in a manner that provides greater security for the code 108, and that is customized for the content of the code 108. The annotations 106 may have been created while the code 108 was being created by a programmer, or at a time after the programming but before the code was requested by a client, and may define manners in which the code can be transformed when it is served so as to obfuscate its operation from malware on a client device.

In this example, the annotations 106 define two transformations to be performed on the code 108 when it is served. Each transformation is indicated in the annotations 106 by the syntax "TXn." Each annotation is followed by data that defines the transformation that is to be performed in the code 108. For example, the transformation TX1 defines a transformation in the form that the string ABC, when it is encountered by a transformation system, is transformed into a particular random string of characters. For example, an analysis system operating at the time that the code 108 was programmed, may have recognized that the programmer used the string ABC as a function or variable name throughout the code, and the analysis system may have been programmed to then recognize that changing the name of the function or variable would not affect the operation of the code on a client device, as long as such changing was performed consistently across all of the code 108. As a result, such a system, in this example, inserted a few lines of instructions in the annotations 106 indicating that such string should be changed before the code is served. As a result, and if the change is made differently each time the code is served, in a polymorphic manner, malware may be blocked from readily interpreting and locating the function or variable name when it receives the served code, because the name will be different for each serving of the code. Specifically, rather than serving the meaningful ABC name consistently, the transcoded code will instead serve a different string each time malware makes a request, and the malware will then have to figure out how to interact with such a moving target (a much harder proposition).

The annotations 106 further identify each location in the code 108 at which transformation TX1 is to occur. Such mapping to particular locations may occur in a variety of manners, and here, is represented in a simplified manner by defining the character position within the plaintext code file at which the string ABC was found to occur when the analysis was performed on the code.

Referring now to a second defined transformation in the annotations 106, transformation TX2 also defines that a particular string of characters is to be transformed into a random string when it is identified in the text. Again, a programming environment or other analysis system may have identified the string XYZ as a string that could be changed consistently throughout the code without affecting the manner in which the code would execute and be seen by a user of a browser that is served and that renders the code 108. With respect to transformation TX2, the analysis system determined that that string appeared at only one location in the code 108, at character position 2221.

In this simplified representation of the code 108, one can see the appearance of the identified strings throughout the code. For example, the string ABC in the form of element 112A, appears at three locations, as suggested by the three numeric location identifiers in the annotations 106. Similarly, the string XYZ, as shown by item 114A, appears at one location in the code 108. In this manner, then, the simplified representation indicates one way in which annotations may be appended to the top of a file of code to provide a transformation template or mapping for the code.

The transformation mapping in the form of annotations 106 may then be implemented at the time the code is served, such as by a security intermediary that is provided the code by a web server system. The security intermediary may be programmed to store a copy of the code 108 in its memory, and then to transform that copy of the code 108 using the annotations 106 as a template or map. For example, the transformation system may step through the lines of the annotations 106 as if it were executing them as code and may implement each of the transformations. Such transformed version of the code is shown at item 110. The transformed code 110 is in the form of an electronic document 104 that will actually be served by an intermediary security system to the requesting client, and includes substitutions as defined in the annotations 106. For example, the string ABC has been transformed in each instance to the random string of characters !X3. Similarly, the string XYZ has been transformed to the randomly selected string of characters ?#+. In actual implementation, a variety of additional and more-complicated transformations may be applied to the code 108, and may be applied across multiple different files of content, including different types of files, such as HTML files, CSS files, and JavaScript files. Also, for the shown two transformations, a different random string will be selected for each serving of the code, so that the modified code is served polymorphically.

The annotations may be connected to the code 108 in a variety of manners. In the example shown here, the annotations 106 are part of a file that contains the code 108 itself. The annotations 106 may be included as a header to that file, and may be hidden by marking them as comments or remarks, so that if the file is executed with the annotations 106 in it, the annotations 106 will not interfere with the execution of the code 108. However, in real implementation, a security intermediary will typically remove the annotations 106 before it serves the transformed code 110. The annotations 106 may also be provided at other locations in the code 108 such as at the end of the code 108 or interspersed throughout the code. For example, to hide the annotations 106 and the nature of operations performed by the annotations 106 from anyone who might intercept the code 108 with the annotations 106, the annotations 106 may be split up throughout the code 108 and interleaved with lines of annotations 106 between lines in the code 108. The annotations may also be provided in an encrypted form, so that, if a security system is non-functional or does not transform the code 108, and the code is served to a client in its original form, malware on the client will not be able to readily identify the sort of countermeasures that are otherwise being applied to that code.

In other implementations, the annotations 106 may be in a separate file from the code 108. For example, a flag may be inserted into the code 108 that points to a separate file that contains the annotations 106, such as by an application development environment (ADE) adding a URL to the code that points to a file that contains the corresponding annotations 106 for the code. When the code 108 is received by a security intermediary or other sort of security system, the flag or pointer may be accessed, and the security system may obtain the annotations 106 to use as a template in transforming the code 108. In yet other embodiments, the security system may obtain access to the annotations 106 that correspond to a particular piece of group of code in other ways, such as by having annotations stored in a predefined location and having the security system access the annotation information in various manners that link the relevant code to the annotations for that code.

The annotations may also identify a number of other operations that a security system should or can perform on the code 108. The annotations may be generated pursuant to an application programming interface (API) produced a security services company that provides software and/or hardware for transforming the code and such API may be used by programmers and by developers of ADEs in assisting with the writing of such annotations. In other examples, the annotations can indicate directives that blocks of code should be parse with different settings than other blocks of code, including by setting a level of aggressiveness to be applied, and indicating particular transformations and/or typer checking for transformations.

Figure 1B:
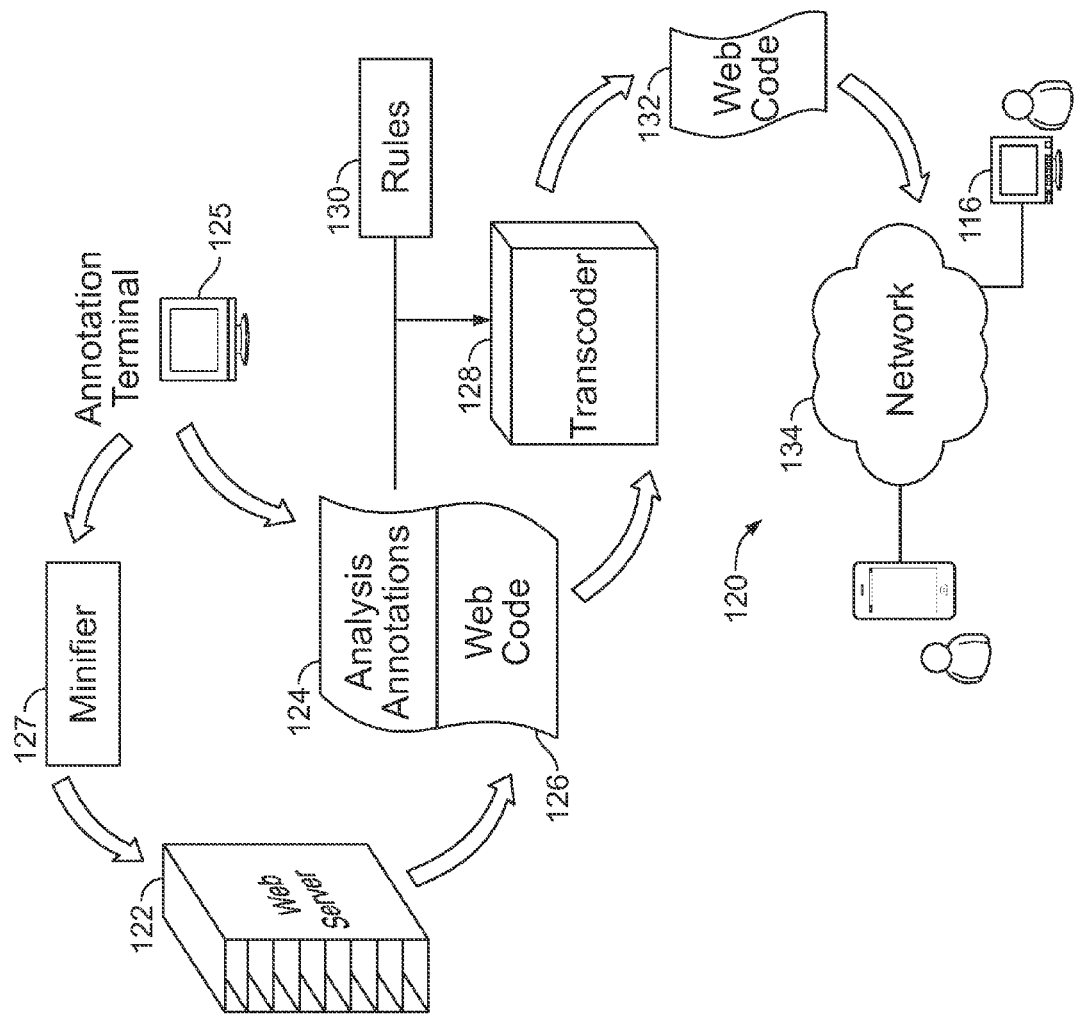
FIG. 1B is a conceptual diagram of a system for analyzing and transcoding web code using pre-annotation of the code.

FIG. 1B is a conceptual diagram of a system 120 for analyzing and transcoding web code using pre-annotation of the code (and of other content that may be served). In general, the system 120 illustrates operations that may be performed in serving content through a network 134 such as the Internet, so as to transcode or transform the content to obfuscate its operation from malware.

Referring more specifically to the system 120, a transcoder 128 sits (physically and/or logically) between a Web server system 122 and the network 134. The Web server system 122 serves content in response to requests from devices such as client device 116, in an ordinary manner for the serving of web code. For example, the Web server system 122 may obtain a request from client device 116 to deliver a web page for display to a user, where the web page provides for the entry of credit card and other financial information for the user. Such a page may be something that the operator of the Web server system 122 wants to prevent being interfered with by malware, so that the operator of Web server system 122 may use the transcoder 128 as part of an intermediary system that intercepts code that is served over network 134, and to transcode the code in various different ways each time the code is served.

As shown in the figure, web code 126 is served from the Web server system 122 and is accompanied by analysis annotations 124. The transcoder 128 may separate the annotations 124 from the web code 126 and use the annotations 124 in combination with transformation rules 130 in order to transcode the web code 126. For example, the annotations 124 may identify locations in the code that should be altered in different manners each time the code 126 is served. The rules 130 may define how the annotations are to be applied generally, whereas the annotations 124 may be specific to the particular instance of web code 126, such as the code for a particular version of a particular webpage.

The web code 126 and corresponding annotations 124 may be generated and associated with each other in various manners. In this example, an annotation terminal 126 is shown and the annotations 124 were generated by software operating in association with the terminal 125 while the web code 126 was being coded by a program. For example, an application development environment (ADE) may provide tools for developing code in a familiar manner, and may be supplemented with tools that analyze the code as it is being written to ensure that the code is amenable to security treatment in the manners performed by transcoder 128. For example, the terminal 125 may be associated with software programmed with rules to identify coding styles or approaches that are amenable to security treatment. It may also be programmed to recognize or determine that a particular style used by a programmer is equivalent to one of the preferred styles, but is not amenable to security treatment. As a result, such software may monitor the coding progress of a programmer as code is added to a system, and may provide pop-up boxes or other user interface mechanisms by which to inform the programmer that the approach he or she is taking could be improved with minor changes to the code. The software may suggest such changes and allow the programmer to select an icon or other input mechanism in order to have the alternative code inserted in the place of the code that the programmer wrote, in order to have the changes automatically applied to the code that the programmer is providing. The software may also show the programmer before-and-after representations of the code as it would be executed so as to better inform the programmer the effect, if any, that the suggested change might have on the execution of the code when it is ultimately served to a user.

The annotation terminal 125 may also interact with a system for minifying the content. As shown here, code that is generated by a programmer at the terminal 125 may be supplied to a minifier 127 before it is made available to the Web server system 122. The minifier 127 may act to reduce redundancies or other items in the code that are not needed by clients that are served the code, and that can thus be removed from the code to reduce its size and the overhead of serving the code, without hurting how the code executes on client devices. Just as the terminal 125 and associated ADE software may provide guidance to a programmer with respect to improving his or her programming for security purposes, the terminal 125 and associated software may provide feedback to a programmer for minification purposes. For example, if a programmer adopts a particular programming technique that is not amenable to minification, the software may determine that such non-amenable code has been written, and in response, may provide to the programmer a suggestion for a different way to perform the coding. The suggestion may also be accompanied by example alternative code that is amenable to minification, and the programmer may select a displayed control (e.g., an icon) to have the alternative code inserted in place of the code he or she typed.

Therefore, the web code 126 may be previously minified, and annotations 124 may be applied to such minified code by the transcoder 128 using rules 130. The output of the transcoder 128, then, is web code 132, which the transcoder 128 may cause to be served to client device 116 through network 134, in response to the request that the client device 116 made to the Web server system 122. For example, as indicated in FIG. 1B, certain names, such as function names and variable names, may be modified as between the initial web code 126 and the web code' 132. Also, the transcoder 128 may serve the same web code 126 many different times, but the web code' 132 may be different for each of those servings. Such changes are generally referred to herein as polymorphic transformations, because they cause a change that differs in many various manners for different servings of the code. Polymorphic transformations may be beneficial in that they may create a moving target for malware at client 116 that is trying to automatically interoperate with the served code 132, or with malicious individuals who are trying to analyze the operation of the served code.

In this example, the annotations specify both translations to be performed and locations in the content (e.g., positions of related code elements) at which those translations are to be performed. In other implementations, additional or less information may be specified by the annotations. Where less information is specified, or in various situations, a transcoding server system may determine other information needed to fully implement the transformations. For example, the annotations may identify positions for transformations (and potentially group the locations as involving a particular type of element, and thus probably in need of a common transform throughout the content), but not specify the transforms themselves, such that the transcoding server system is responsible for making such a determination of what transform or transforms to apply. Also, while the example here discusses offsets for identifying locations or positions, such information may be identified lexically or syntactically (e.g., XPATH for HTML or similar mechanisms for JavaScript, CSS, and other content).

Figure 2A:
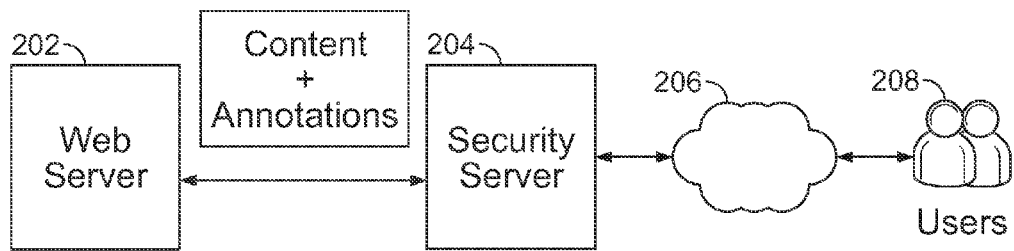
FIGS. 2A-2C show examples of system architectures for passing web code and annotation information for polymorphic transcoding of served web content.
Figure 2B:
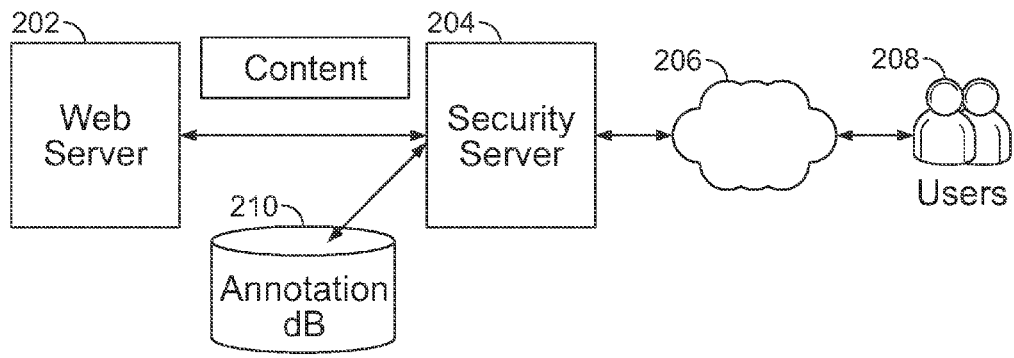
Figure 2C:
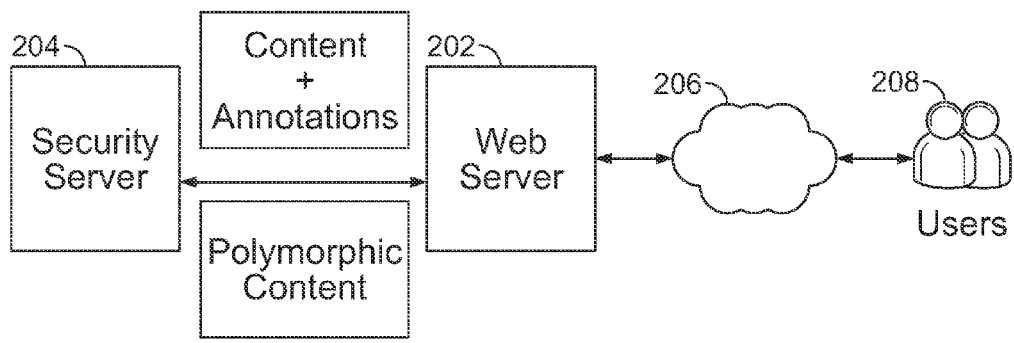

FIGS. 2A-2C show examples of system architectures for passing web code and annotation information for minification and polymorphic transcoding of served web content. In general, the different architectures that are displayed provide examples of different manners in which content may be shared between a Web server system 202 and a security server system 204, and manners in which the security server system 204 may obtain access to annotations to be used in polymorphically transcoding and minifying content from the Web server system 202.

Referring now to a first example in FIG. 2A, a Web server system 202 serves both content and annotations to a security server system 204, which then serves trans-coded versions of the content through a network 206, such as the Internet, to one or more users 208. Such an example may be similar to that shown in FIGS. 1A and 1B, where the content is the code that is served by the Web server system 202, and the annotations are appended to such code in a single file with the code. Alternatively, the content and annotations may be provided in separate files but as part of a single communication transaction, so that the security server system 204 may understand readily that the particular content and particular annotations are to be associated with each other because they were received together, and the annotations are to be used in transcoding the content.

A second example, shown in FIG. 2B, separates the annotations from the content. In this example, then, the Web server 202 provides the content to the security server system 204. Such content may include a URL or other mechanism to inform security server system 204 to obtain annotations related to the content and also perhaps to identify where such annotations are located. In this example, an annotation database 210 may store a variety of annotation rules or templates for multiple different pieces of content. For example, the annotation database 210 may have been populated by an ADE system like that described in FIG. 1A.

Therefore, the security server system 204 may first receive the content, may parse the content to identify a reference to certain annotations, may follow the reference to the annotation database to obtain the particular annotations that are relevant to the served content, and may then apply the annotations to the content to produce transformed content that is served through network 206 to users 208.

The annotations may also, in some implementations, require some translation or analysis in addition to simply being applied to the content. For example, the annotations may specify types of transformation to be applied to the content and locations in the content where the transformations are to be made, but may not specify the steps needed to make such changes. The security server system in such an example may access the annotations, use the identifiers in the annotations to identify the types of transformations to be made, and may consult a different data source to identify steps to be taken to make the transformations In a third example, indicated in FIG. 2C, the position of the Web server system 202 and the security server system 204 has been reversed form the prior examples, with the Web server system 202 serving content directly to the network 206 and users 208 instead of serving the content through the security server system 204. To apply security transformations discussed here, the Web server system 202 may initially provide content and annotations to the security server system 204. Alternatively, the security server system 204 may be provided with the content and may separately acquire the annotations such as in the example of FIG. 2B. The security server system 204 may then perform transformation operations on the content using the annotations, and may return to the Web server system 202 the polymorphic content that had security countermeasures applied to it. The Web server system 202 may then serve such polymorphic content through the network 206 to the users 208. This example, then, allows the web server system 202 to be more involved in the ultimate serving of content and to maintain more control over what is served and how it is served.

As described in further detail below, additional security countermeasures may also be applied to any of these particular example implementations, such as the addition of supplemental instrumentation code to the transformed code so as to monitor how the code interacts with other resources on clients operated by users 208.

Figure 3A:
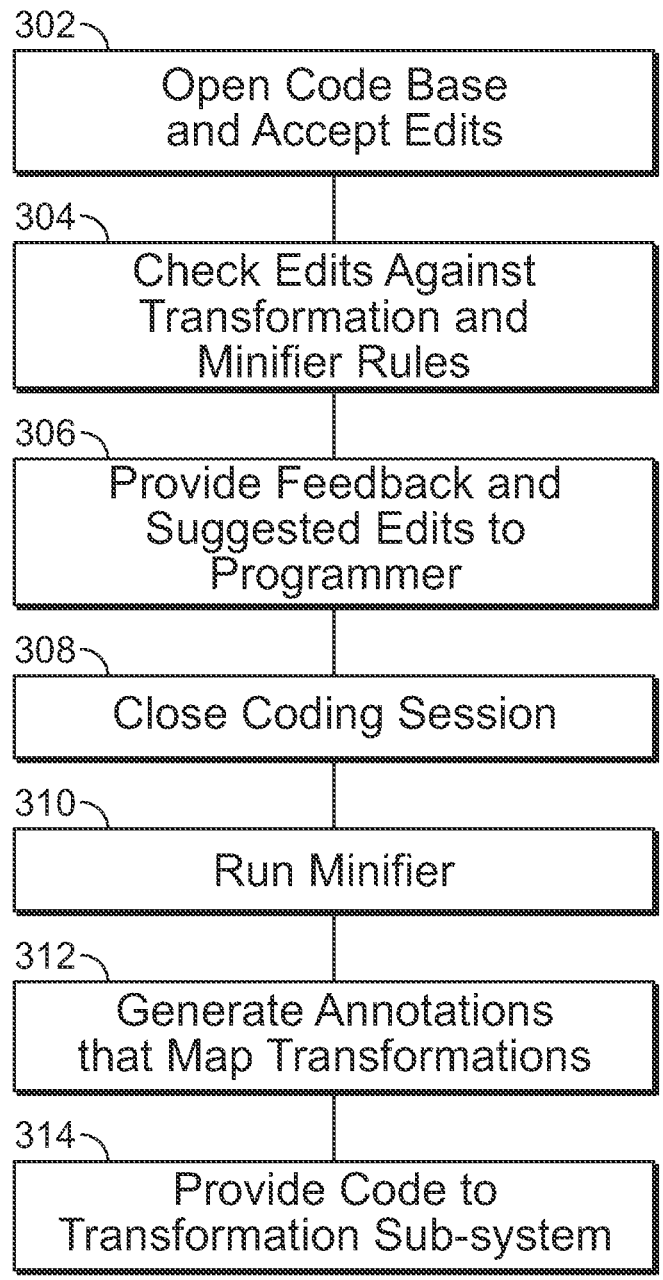
FIG. 3A is a flow chart of a process for generating code for minification and transcoding.

FIG. 3A is a flow chart of a process for generating code for minification and transcoding. In general, the process centers around analysis of web code, where the analysis may be performed at various times, such as during a time when the web code is being written by a programmer, and to supplemental content that is created for assisting in the transformation of the web code that is to be served by a Web server system. Such supplemental content may include templates or maps that indicate types of changes and locations of changes within the code that are to be made to the code when it is served for purposes such as security countermeasures that interfere with the operation of malware on client devices to which the content is served.

The process begins at box 302, where a code base is opened by a programmer and an ADE for the code base is used by the programmer. Such programming may occur in various familiar manners, such as by the programmer accessing files managed by a revision control system, and typing lines of code to perform a desired operation. In certain instances, analyzers may assist the programmer in generating the code. For example, where a programmer is working on a particular page that requires security or on a project that requires security, an analyzer for security transformations may be operating in the background while the programmer works.

At box 304, edits made by the programmer are checked against transformation and minifier rules. For example, if a programmer defines a function or other relevant named object within the code, an analyzer may recognize the presence of a name for that object within a particular syntax for the programming code, and may determine whether that name is something that may be polymorphically transcoded without affecting the operation of the code. In a similar manner, the same or a different module that is part of the ADE may determine when code is provided that could be changed, so that the resulting code could be more effectively minified. Such module may recommend changes to the programmer in a similar manner.

At box 306, as noted, feedback and suggested edits are provided to the programmer. In certain instances, changes may be made automatically where such changes clearly will not affect the presentation of the code, or affect the particular programmer's treatment of the code at a later time.

At box 308, the coding session is closed. For example, the programmer may indicate that the code is ready to ship, such as by compiling the code or placing it at a location for code that should be served by a computer server system to customers of the organization that employs the programmer. Such steps may cause the code to be transferred to a system separate from the ADE system. At this stage, further analysis may be applied to the code, such as analysis to identify additional elements in the code that can be added to a template or map that guides application of security countermeasures to the code. In certain implementations, no suggestions are made during the programming, and the analysis may simply occur after the programmer has indicated that he or she is done programming and has released the code.

At box 310, a minifier is run against the code. The minifier may take various familiar forms, and may perform both HTML minifying and JavaScript minifying, among others. The analysis for transcoding and the analysis for minifying may be supervised or unsupervised. Unsupervised analysis may involve computer operation without a human confirming that the changes defined by the computer analysis will not break the code. Supervised analysis may involve a user interacting with the code that has been subject to changes that are defined by the automatic analysis, such as minification changes and security countermeasure changes. In such a manner, a supervising individual may cause certain of the changes that the automated system suggests to be canceled or reversed, if such changes are determined by that person to affect the manner of presentation for the content.

At box 312, annotations are generated that map the transformations that the analysis process has determined to be useful in the code. For example, the analysis may look for function names or other such names as described above, and may identify where a particular instance of a function name occurs throughout the code base and map to locations where the name occurs. The generation of annotations may occur in a form similar to that shown in the annotations 106 in FIG. 1A, where a process generates data that can be used by a transformation subsystem at a later time when the code is requested for serving. One benefit of performing the analysis before the code is requested is that analysis may be computationally expensive as compared to simply applying the template or map that is generated from the analysis. As a result, it may be beneficial to have to perform only the computationally inexpensive portion of the process when the code is requested, so as to reduce any time lag in the serving of the code.

At box 314, the code is provided to a transformation subsystem. Such provision of the code may occur in various manners. For example, a copy of the code may be provided to the transformation subsystem, such as a security intermediary device, by the Web server system for every request for the code. The transformation subsystem may then obtain the corresponding annotations for that particular example of code, such as by the annotations being included in a file of the code, or being pointed to by a flag in the code such as a URL. As indicated in FIG. 1B, then, a transcoder 128 may combine such information with rules 130 in order to generate a transcoded version of the code. In other examples, the transformation system may cache copies of the code so that it need not ask the Web server system for new copies when repeated requests are made by the same or different users for the same code. In such a situation, the transformation system may also monitor for changes to the code by the programmer, so that the cache may be updated when meaningful changes occur, and additionally, analysis may be performed again on the updated code and new annotations may be generated.

In this manner then, the process permits for analysis of code both for security countermeasures and minification at a time that is before a request for the code is made. The results of the analysis may be used by a transformation system after the request for the code is made, and the results may be obtained by the transformation system by analyzing a connection from the code to the annotations, such as by the annotations being included the same file with the code (e.g., in comments embedded in the code or in a header for the code) or by the code including a pointer toward the annotations that are to be used.

Figure 3B:
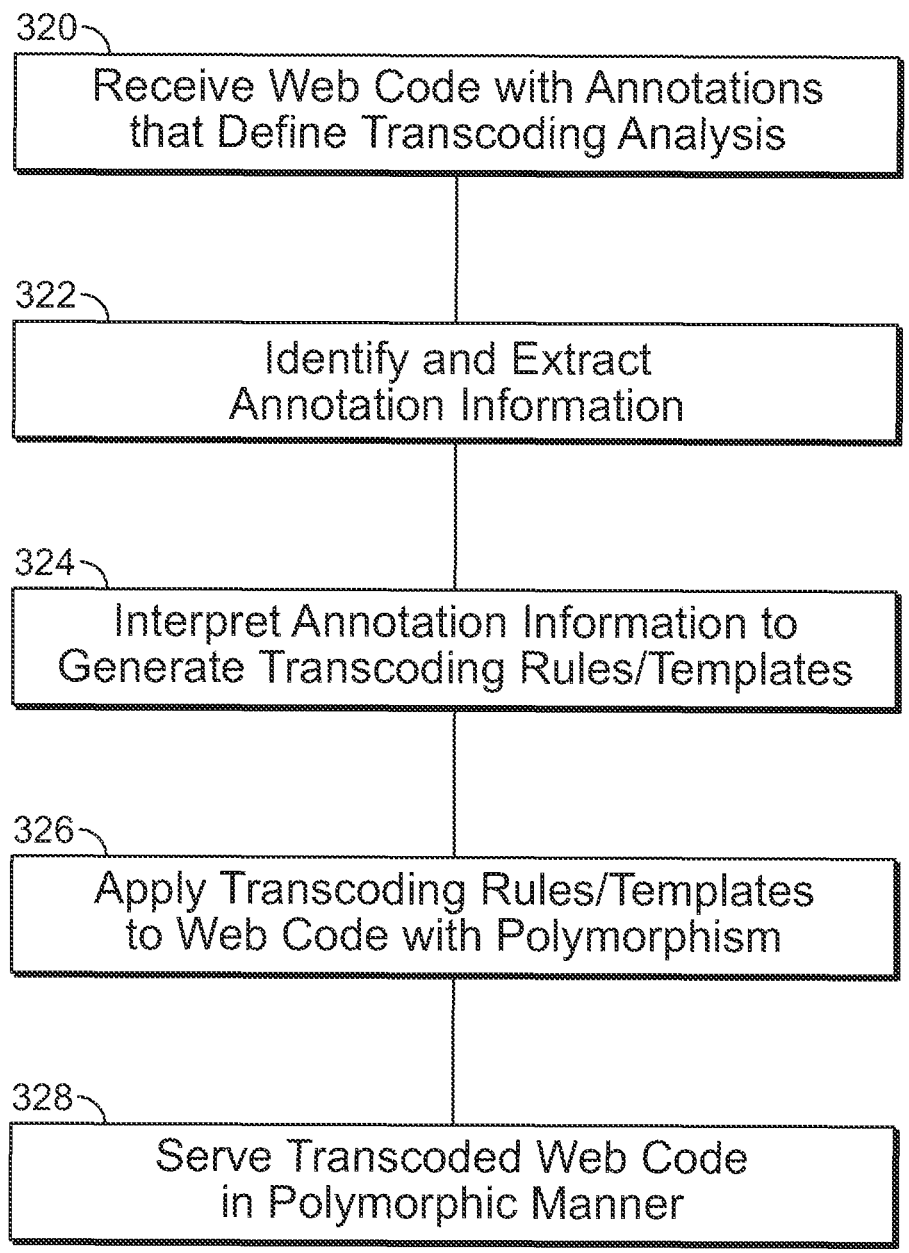
FIG. 3B is a flow chart of a process for handling web code for analysis and polymorphic transcoding.

FIG. 3B is a flow chart of a process for handling web code for analysis and polymorphic transcoding. In general, the process involves transformation of requested code by using annotations that were generated before the request was received, and that define transformations that should be performed on the code, without a need for analysis of the original code at the time of the request for the code.

The process begins a box 320, where web code with annotations is received, such as from a cache or a Web server system. The web code may be included in an electronic file that also includes the annotations, or may be obtained by a system that has parsed and analyzed the code to find a reference to a file that includes the annotations. As described above, the annotations may define particular changes that need to be made to the code when it is served, so as to provide for polymorphic serving of the code. Such defined changes may be in the form of a template or map that defines the type of each change and the location of each change in the code that is to be transformed. The use of such a well-defined map or template may alleviate the need to perform additional analysis or at least complete additional analysis at the time of serving of the content to requested clients.

At box 322, the annotation information is identified and extracted. For example, a transformation system may be programmed to look for a particular reserved tag that is used by a programming system to identify annotation commands or definitions. The system may search for such tags and extract all text that corresponds to the tags and copy that text into storage that may then be parsed in applying the transformations defined by the text.

At box 324, the annotation information is interpreted to generate transcoding rules or templates to be applied to the code. In certain embodiments, the annotations themselves may directly find the rules that will be applied, whereas in other embodiments, certain extra processing of the text in the annotations may be required before the transformations may be executed. The result of such processing or interpretation may be an easily read map that may be used by the transformation system to locate portions of the code to be transformed and to readily provide transformations for those portions of the code.

At box 326, the transcoding rules or templates are applied to the web code with polymorphism. That means, for example, that portions of the web code may be removed or replaced with different alphanumeric characters than were in the web code, though in a manner that does not break the execution of the web code. Also, the replacing alphanumeric characters may differ between different servings of the web code even though the alphanumeric characters that they replace have not changed. Such polymorphic changing of the characters in the code will, however, need to be performed in a consistent manner across all the code that does not break the operation of the code.

Figure 4:
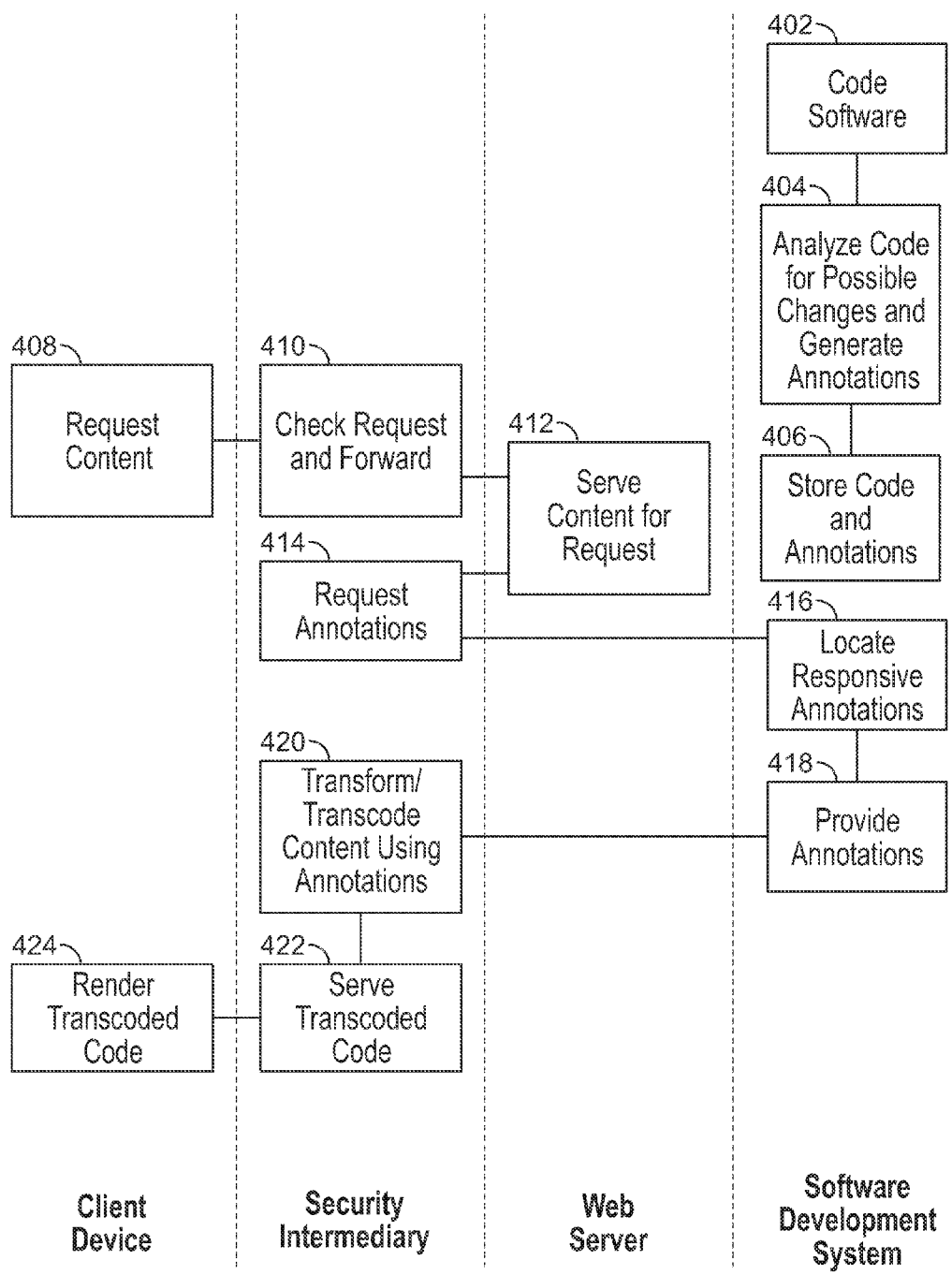
FIG. 4 is a swim lane diagram of a process for adding annotations to web content to be served polymorphically.

At box 328, the transcoded web code is served in a polymorphic manner. For example, the received code may have the annotations stripped from it if the annotations were received in the same file as the code, the code may be minified to reduce its size and the bandwidth that it requires, the code may be supplemented with other code as described in more detail below, and the code may then be served in an ordinary manner, either directly by the transformation system, or indirectly by the transformation system passing the transformed code back to the Web server system which will then serve the code to the requesting client sleep FIG. 4 is a swim lane diagram of a process for adding annotations to web content to be served polymorphically. In general, the process is similar to those shown and discussed above, but indicates example actions that can be taken by each of different components in a system, so as to more plainly explain such operation.

The process begins at box 402, where a programmer using a software development system writes software, such as code for generating a web page on a web browser. Such code and other content can take a variety of forms that interact with each other, including HTML files, CSS files, and JavaScript files. Any appropriate type of web page may be generated in this process, though typically the process would be applied to pages that have security concerns for a company that serves the pages.

At box 404, the software development system analyzes the software to identify changes that can be made to the code when it is served, including polymorphic transformations for adding security to the code, and minification to make the served code smaller. The analysis may be essentially continuous as the code is developed, or after the code is completed and published by a programmer. Such analysis is shown here as being completed by the software development system, but could alternatively or additionally be performed by the security system.

At box 406, the code is stored. The code may be stored together with the annotations or separately from the annotations. As later shown, other components request the code and annotations from the software development system, but either or both could be stored under the control of another system such as the Web server system or the security system. At this point, the code is ready for being requested by clients and served in response to such requests.

Such a request is received from a client device at box 408. The request is directed to the Web server system but is intercepted by the security system (which make act as a CDN). If the request were in response to previously served content, it may have included transformed content in it which would need reverse transformation, but in this situation, the security system determines that this is a "fresh" request, and thus just passes the request through to the Web server system. The Web server system receives the request and serves it in an ordinary manner by obtaining the appropriate code and other content, packaging it, and serving it. The served code is again intercepted by the security system (box 414), which begins processing it to add security countermeasures to it. In this example, the code includes a pointer such as a URL aimed at a storage location for the annotations, which in this example are stored with the software development system. The security system makes a request for the annotations by following the URL (box 414) and the software development system returns the annotations in response to the request (box 418). At box 420, the security system then uses the annotations in combination with other items, such as transformation rules that are identified by particular entries in the annotations, to transform the code, such as by applying polymorphic transformations to various elements in the code and other content. At box 422, the security system serves the code, and at box 424, the client device renders it, such as by displaying the code and other content on a web browser.

Figure 5:
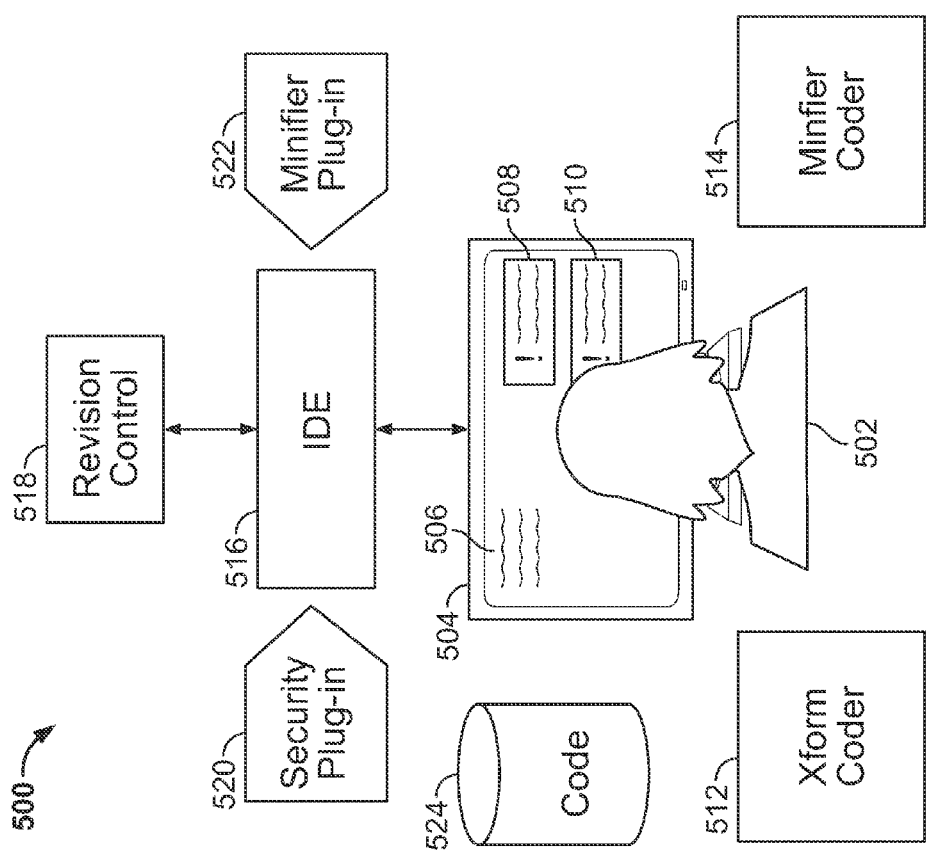
FIG. 5 shows an example of components for assisting in minification and transcoding of developed web content.

FIG. 5 shows an example of components for assisting in minification and transcoding of developed web content. In general, the components are shown as part of a system 500 that may be accessed by a computer programmer in developing software code, and that may aid the programmer in the development of the code, and particularly in helping the programmer develop code that is most amenable to the insertion of security countermeasures and to minification.

Referring now more particularly to the components, the system 500 includes an integrated development environment (IDE) 516 that manages most portions of the software development process in a familiar manner. The IDE 516 in particular, includes a user interface 504 that may provide word processing functionality and other associated programming a to a programmer in a familiar manner. For example, the user interface 504 may provide access to a revision control system (RCS) 518 that interacts with the IDE 516 to maintain control over who accesses a source code base, and to maintain a history of that source code base.

The user interface 504, in this example is shown to have three main elements. Element 506 is a main display of the source code on which the programmer 502 is currently working. The programmer 502 may use a cursor to navigate through the visual display of such code 506 and may type or cut and paste code into an out of the source code in familiar manners. Elements 508 and 510 represent, respectively, output from a security plug-in 520 and a minifier plug-in 522. Element 508 indicates messages that are generated by the security plug-in 520, such as messages that indicate to the programmer 502 that code he has just written may be better written in an equivalent manner for execution purposes, but in a manner that is more amenable to polymorphic transformation analysis and treatment. A minifier plug-in 522 may generate similar messages to the programmer 502 through element 510. Such messages may include a blinking alert to catch the programmer's 502 attention, along with text indicating an opportunity for the programmer 502 to improve the operation of the code with respect to both security and minification.

A code base 524 is separately provided and represents current copies of source code or object code for a particular project. The manner in which the code base 524 is organized may vary according to the particular implementation and environment that is being operated by the organization for which programmer 502 works.

Guides 512 and 514 are shown here to represent information that may be provided to the programmer 502 in advance of the programmer 502 undertaking a programming task. Guide 512 is a transform coder guide that explains best methods for programming, in a manner that allows for efficient and effective security polymorphic transformation of code. Similarly, guide 514 is a minifier coder guide, which explains to a programmer techniques that may be used to maximize the degree to which code may be compressed or minified before it is served. By the system 500 shown here then, a programmer 502 may be able to operate according to a traditional IDE 516 and traditional user interface 504, but may be guided in a nonintrusive manner to improve the code that is generated in various ways. Such code may be provided within the systems shown, for example, in FIGS. 1B and 6, and in the processes shown in FIGS. 3A, 3B, and 4.

Figure 6:
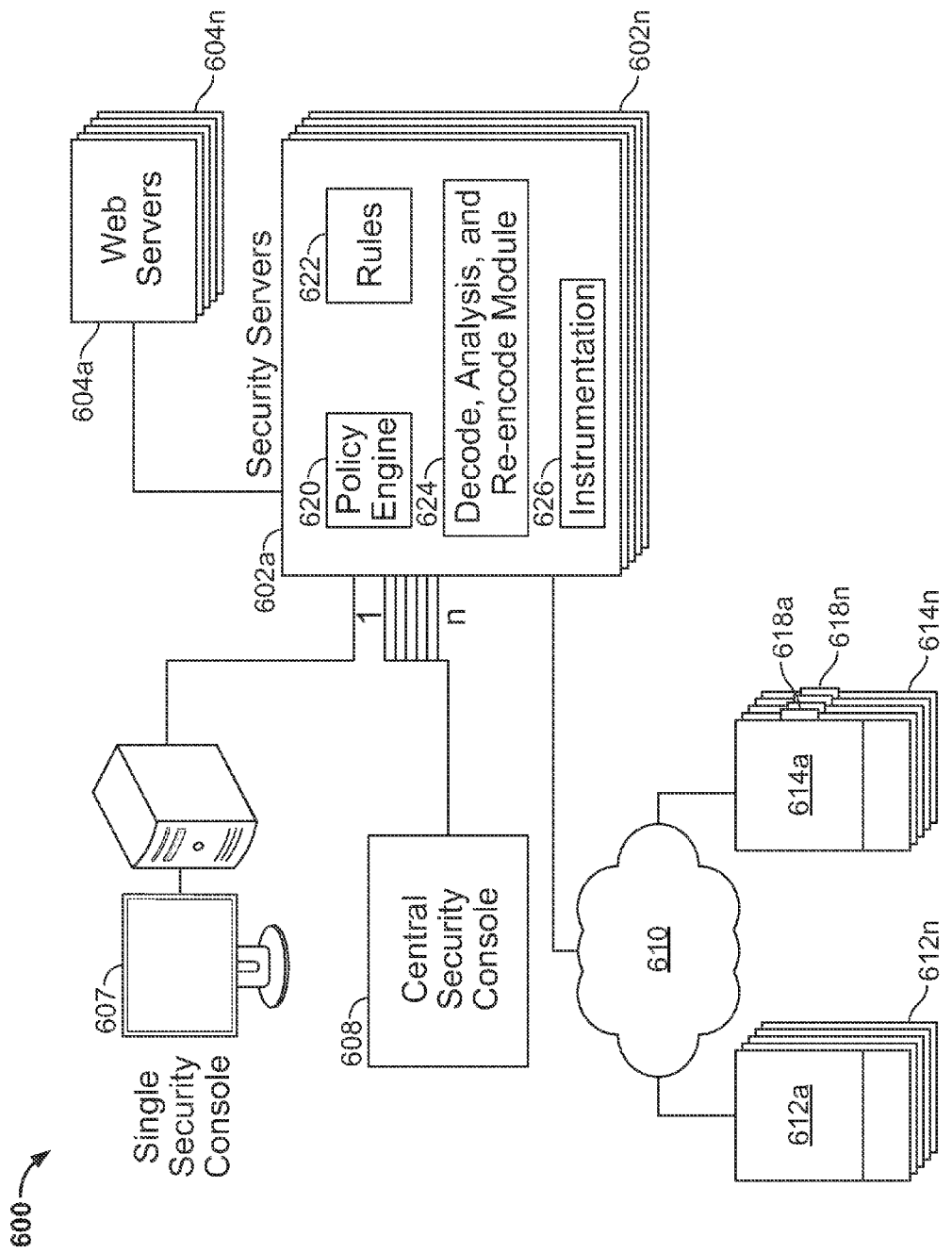
FIG. 6 shows a system for serving polymorphic and instrumented code.

FIG. 6 shows a system 600 for serving polymorphic and instrumented code. Generally, polymorphic code is code that is changed in different manners for different servings of the code in manners that do not affect the manner in which the executed code is perceived by users, so as to create a moving target for malware that tries to determine how the code operates, but without changing the user experience. Instrumented code is code that is served, e.g., to a browser, with the main functional code and monitors how the functional code operates on a client device, and how other code may interact with the functional code and other activities on the client device.

The system 600 may be adapted to perform deflection and detection of malicious activity with respect to a web server system. Deflection may occur, for example, by the serving of polymorphic code, which interferes with the ability of malware to interact effectively with the code that is served. Detection may occur, for example, by adding instrumentation code (including injected code for a security service provider) that monitors activity of client devices that are served web code.

The system 600 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 604a-204n, and could include a broad array of web servers, content servers, database servers, financial servers, load balancers, and other necessary components (either as physical or virtual servers).

In this example, security server systems 602a to 602n (which may implement components like the decoder 110 described with respect to FIG. 1) may cause code from the web server system to be supplemented and altered. In one example of the supplementation, code may be provided, either by the web server system itself as part of the originally-served code, or by another mechanism after the code is initially served, such as by the security server systems 602a to 602n, where the supplementing code causes client devices to which the code is served to transmit data that characterizes the client devices and the use of the client devices in manners like those discussed in the many examples above. As also described below, other actions may be taken by the supplementing code, such as the code reporting actual malware activity or other anomalous activity at the client devices that can then be analyzed to determine whether the activity is malware activity.

The set of security server systems 602a to 602n is shown connected between the web servers 604a to 604n and a network 610 such as the internet. Although both extend to n in number, the actual number of sub-systems could vary. For example, certain of the customers could install two separate security server systems to serve all of their web server systems (which could be one or more), such as for redundancy purposes. The particular security server systems 602a-202n may be matched to particular ones of the web server systems 604a-204n, or they may be at separate sites, and all of the web servers for various different customers may be provided with services by a single common set of security servers 602a-202n (e.g., when all of the server systems are at a single co-location facility so that bandwidth issues are minimized).

Each of the security server systems 602a-202n may be arranged and programmed to carry out operations like those discussed above and below and other operations. For example, a policy engine 620 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer.

When such code returns, the policy information may be provided to a decode, analysis, and re-encode module, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their inter-operation with each other will be consistent even after the re-encoding.

The actions generated by policy system 620 may occur in various places and at various times. For example, the actions may be performed to analyze code soon after it is authored and before it is request by a client. In such a situation, the analysis may be performed by a software development system or may be performed by a non-real-time component of a security system, where such a component may periodically scan a code base looking for changed content, and may perform an analysis when such a change is found. The analysis may be performed to create, or may be guided by, annotations that are sorted with the code or referenced by the code. The annotations may guide an analysis component of a transcoding security system and/or a component that implements transcoding of the code using templates or maps generated form the analysis.

Both the analysis of content for determining which transformations to apply to the content, and the transformation of the content itself, may occur at the same time (after receiving a request for the content) or at different times. Such analysis may also use annotations as discussed above as input, or may generate annotations for later use in the process. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 602a-202n, such as by the security servers 602a-202n implementing a web crawler (not shown) to recursively search for new and changed content and to report such occurrences to the security servers 602a-202n, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 622 may store analytical rules for performing such analysis and for re-encoding of the content. The rules engine 622 may be populated with rules developed through operator observation of particular content types, such as by operators of a system studying typical web pages that call JavaScript content and recognizing that a particular method is frequently used in a particular manner. Such observation may result in the rules engine 622 being programmed to identify the method and calls to the method so that they can all be grouped and re-encoded in a consistent and coordinated manner.

The analysis may be made simpler where analysis-related annotations are present in or with the content, where such annotations identify locations at which transformations could be performed, define the transformations to be performed at those locations, and/or other factors that can assist in the transformation of the content so that less analysis is needed closer to run-time for a system. Various mechanisms for providing such annotations in relation with particular content, and mechanisms for using such annotations in the transformation of content are discussed in detail above.

The decode, analysis, and re-encode module 624 encodes content being passed to client computers from a web server according to relevant policies and rules. The module 624 also reverse encodes requests from the client computers to the relevant web server or servers. For example, a web page may be served with a particular parameter, and may refer to JavaScript that references that same parameter. The decode, analysis, and re-encode module 624 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 602 along with an identifier for the particular client computer so that the system 602 may know which key or function to apply, and may otherwise maintain a state for the client computer and its session. A stateless approach may also be employed, whereby the system 602 encrypts the state and stores it in a cookie that is saved at the relevant client computer, or in a hidden field such as a field on a form that is being presented to a user and for which the input to the form is being obfuscated in a polymorphic manner. The client computer may then pass that cookie data back when it passes the information that needs to be decoded back to its original status. With the cookie data, the system 602 may use a private key to decrypt the state information and use that state information in real-time to decode the information from the client computer. Such a stateless implementation may create benefits such as less management overhead for the server system 602 (e.g., for tracking state, for storing state, and for performing clean-up of stored state information as sessions time out or otherwise end) and as a result, higher overall throughput.

The decode, analysis, and re-encode module 604 and the security server system 602 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The decode, analysis, and re-encode module 624 may be adapted to apply different modifications to each instance of a common web resource, or common portion of a web resource, such that the web code that it is ultimately delivered to the client computers in response to each request for the common web resource includes different modifications.

In certain implementations, the analysis can happen a single time for a plurality of servings of the code in different recoded instances. For example, the analysis may identify a particular function name and all of the locations it occurs throughout the relevant code, and may create a map to each such occurrence in the code. Subsequently, when the web content is called to be served, the map can be consulted and random strings may be inserted in a coordinated matter across the code, though the generation of a new name each time for the function name and the replacement of that name into the code, will require much less computing cost than would full re-analysis of the content. Also, when a page is to be served, it can be analyzed to determine which portions, if any, have changed since the last analysis, and subsequent analysis may be performed only on the portions of the code that have changed.

Even where different modifications are applied in responding to multiple requests for a common web resource, the security server system 602 can apply the modifications in a manner that does not substantially affect a way that the user interacts with the resource, regardless of the different transformations applied. For example, when two different client computers request a common web page, the security server system 602 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

An instrumentation module 626 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 602 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 602, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 604a-704n, as encoded by decode, analysis, and re-encode module 624, may be rendered on web browsers of various client computers. Uninfected client computers 612a-212n represent computers that do not have malicious code programmed to interfere with a particular site a user visits or to otherwise perform malicious activity. Infected client computers 614a-214n represent computers that do have malware or malicious code (218a-218n, respectively) programmed to interfere with a particular site a user visits or to otherwise perform malicious activity. In certain implementations, the client computers 612a-212n, 614a-214n may also store the encrypted cookies discussed above and pass such cookies back through the network 610. The client computers 612a-212n, 614a-214n will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 612a-212n, 614a-214n. For small-scale analysis, each web site operator may be provided with a single security console 607 that provides analytical tools for a single site or group of sites. For example, the console 607 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

Console 607 may also be multiple different consoles used by different employees of an operator of the system 600, and may be used for pre-analysis of web content before it is served, as part of determining how best to apply polymorphic transformations to the web code. For example, in combined manual and automatic analysis like that described above, an operator at console 607 may form or apply rules 622 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions.

A central security console 608 may connect to a large number of web content providers, and may be run, for example, by an organization that provides the software for operating the security server systems 602*a*-202*n*. Such console 608 may access complex analytical and data analysis tools, such as tools that identify clustering of abnormal activities across thousands of client computers and sessions, so that an operator of the console 608 can focus on those clusters in order to diagnose them as malicious or benign, and then take steps to thwart any malicious activity.

In certain other implementations, the console 608 may have access to software for analyzing telemetry data received from a very large number of client computers that execute instrumentation code provided by the system 600. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 608 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 600, may be blocked from interaction, or may have their operators notified that their computer is potentially running malicious software (e.g., by sending an e-mail to an account holder of a computer so that the malicious software cannot intercept it easily).

Figure 7:
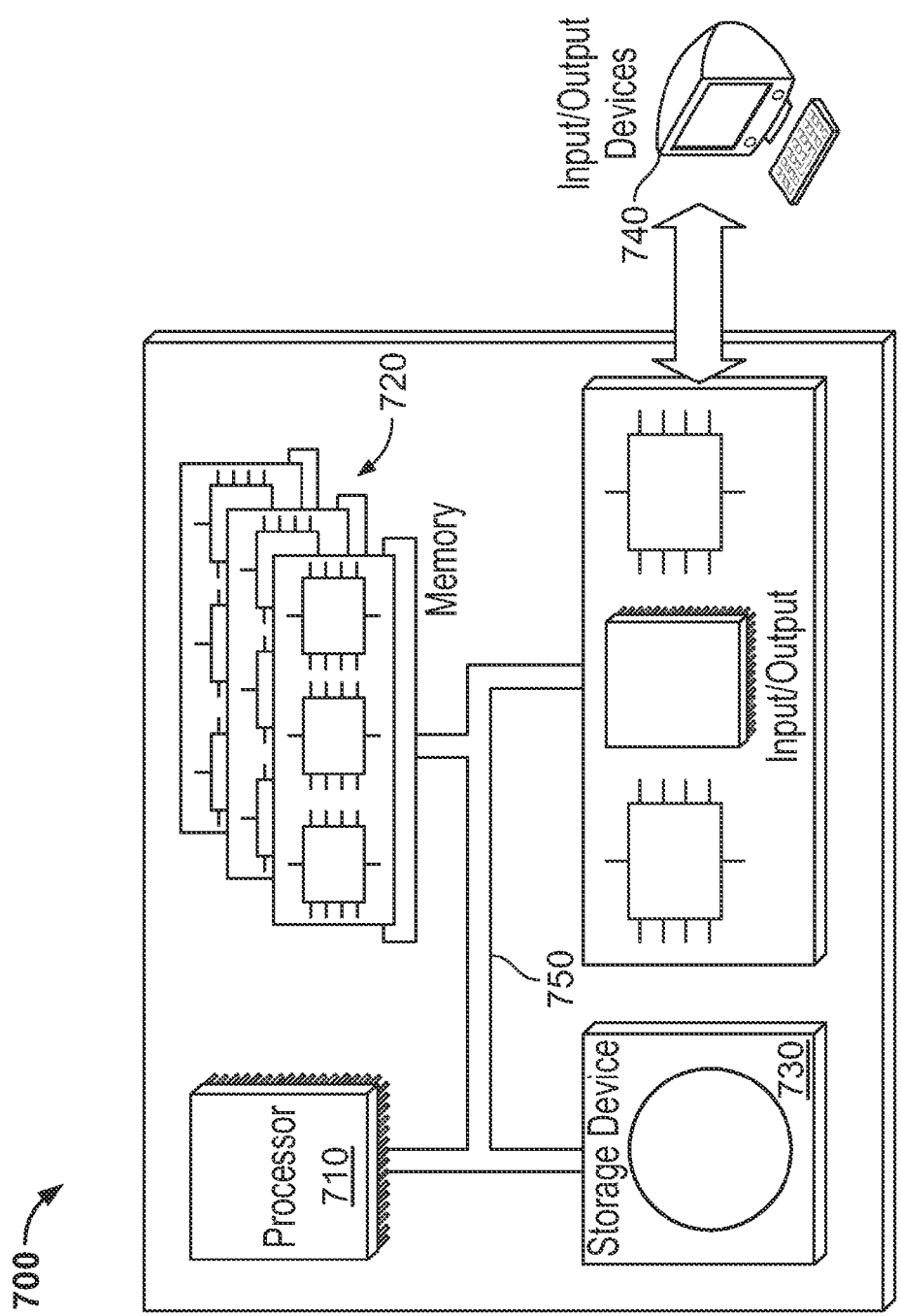
FIG. 7 shows an example computer system.

FIG. 7 shows an example of a computer system 700. The system 700 can be used for the operations described in association with any of the computer-implement methods described previously, according to one implementation. The system 700 is intended to include various forms of digital computers, such as laptops, desktops, workstations, personal digital assistants, servers, blade servers, mainframes, and other appropriate computers. The system 700 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, at a content transformation sub-system, content requested by a client device;
accessing annotation information that identifies one or more portions of the content to be transcoded, wherein the annotation information is generated by a content analysis sub-system;
transcoding the content, by the content transformation sub-system, at the one or more portions, wherein the transcoding comprises inserting additional executable code, that, when executed on the client device, identifies attempted interaction on the client device with the content by malware and transmits a report from the client device comprising data corresponding to the attempted interaction; and
after transforming the content, providing the content to the client device that requested the content;
wherein the computer-implemented method is performed by one or more computing devices.

2. The computer-implemented method of claim 1, further comprising interpreting, by the content transformation sub-system, the annotation information to generate transformations that are to be performed on the one or more portions of the content.

3. The computer-implemented method of claim 1, wherein the annotation information defines a plurality of types of transformations that are to be applied to the one or more portions of the content.

4. The computer-implemented method of claim 1, wherein the annotation information is received by the content transformation sub-system with the one or more portions of the content in a common electronic file.

5. The computer-implemented method of claim 1, wherein content received by the content transformation sub-system includes the annotation information, and wherein the content provided to the client device after transforming the content does not include the annotation information.

6. The computer-implemented method of claim 1, wherein the content received by the content transformation sub-system includes information that identifies a location at which the annotation information can be accessed by the content transformation sub-system.

7. The computer-implemented method of claim 1, wherein the additional executable code is generated by an intermediary security server system that intercepts data served from, and requests provided to, a web server system hosting the content.

8. The computer-implemented method of claim 1, wherein the annotation information is generated based on input entered by a programmer of the content, in response to suggestions for annotations automatically provided by a software development environment.

9. The computer-implemented method of claim 1, further comprising applying minification rules to the content to reduce a size of the content before providing the content to the client device.

10. A content transformation system, comprising:
one or more hardware processors; and
a memory coupled to the one or more hardware processors and storing one or more instructions, which when executed by the one or more hardware processors cause the one or more hardware processors to:
receive content requested by a client device;
access annotation information that identifies one or more portions of the content to be transcoded, wherein the annotation information is generated by a content analysis sub-system;
transcode the content at the one or more portions, wherein the transcoding comprises inserting additional executable code, that, when executed on the client device, identifies attempted interaction on the client device with the content by malware and transmits a report from the client device comprising data corresponding to the attempted interaction; and
after transforming the content, provide the content to the client device that requested the content.

11. The content transformation system of claim 10, wherein the annotation information is received with the one or more portions of the content in a common electronic file.

12. The content transformation system of claim 10, wherein the one or more instructions, when executed by the one or more hardware processors, cause the one or more hardware processors to generate transformations that are to be applied to the one or more portions of the content.

13. The content transformation system of claim 10, wherein the annotation information defines a plurality of types of transformations that are to be applied to the one or more portions of the content.

14. The content transformation system of claim 10, wherein the content received includes information that identifies a location at which the annotations can be accessed.

15. The content transformation system of claim 10, wherein the annotation information is generated by a software development environment used to generate the content.

16. The content transformation system of claim 10, wherein the one or more instructions, when executed by the one or more hardware processors, cause the one or more hardware processors to apply minification rules to the content to reduce a size of the content before providing the content to the client device.

17. A computer-implemented system, comprising:
one or more hardware processors; and
a memory coupled to the one or more hardware processors and storing one or more instructions, which when executed by the one or more hardware processors cause the one or more hardware processors to:
generate a programming environment for generating content comprising program code;
accepting, in the programming environment, annotation information entered by a programmer using the programming environment to generate the content, wherein the annotation information identifies one or more portions of the program code and one or more transformations to apply to the one or more portions of the program code such that the one or more portions are altered a different way, based on the same annotation information, for one or more different times the content is served;
wherein the one or more transformations comprise inserting additional executable code, that, when executed on a client device, identifies attempted interaction on the client device with the program code by malware and transmits a report from the client device comprising data corresponding to the attempted interaction.

18. The computer-implemented system of claim 17, wherein the one or more instructions, when executed by the one or more hardware processors, cause the one or more hardware processors to store the annotation information in a database in association with the content, wherein a content transformation system accesses the annotation information from the database.

19. The computer-implemented system of claim 17, wherein the one or more instructions, when executed by the one or more hardware processors, cause the one or more hardware processors to generate a single electronic file comprising the content and information indicating a location at which the annotation information can be accessed by a content transformation sub-system.

20. The computer-implemented system of claim 17, wherein the one or more instructions, when executed by the one or more hardware processors, cause the one or more hardware processors to generate a single electronic file comprising the content and the annotation information to a web server system.

21. The computer-implemented system of claim 20, wherein a content transformation sub-system receives the single electronic file in response to a client device requesting the content from the web server system and transforms the one or more portions of the content in accordance with the annotation information.

* * * * *